(12) United States Patent
Tierney et al.

(10) Patent No.: US 11,498,874 B2
(45) Date of Patent: Nov. 15, 2022

(54) MULTI-PHASIC CERAMIC COMPOSITE

(71) Applicant: SAINT-GOBAIN CERAMICS & PLASTICS, INC., Worcester, MA (US)

(72) Inventors: Diana R. Tierney, Lewiston, NY (US); Matthew Creedon, Kenmore, NY (US); Tom J. Trunzo, Sanborn, NY (US); Kenneth R. Delahunty, Niagara Falls, NY (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 131 days.

(21) Appl. No.: 16/938,529

(22) Filed: Jul. 24, 2020

(65) Prior Publication Data

US 2020/0354278 A1    Nov. 12, 2020

Related U.S. Application Data

(63) Continuation of application No. 16/219,380, filed on Dec. 13, 2018, now Pat. No. 10,800,709, which is a
(Continued)

(51) Int. Cl.
*C04B 35/565* (2006.01)
*B32B 18/00* (2006.01)
(Continued)

(52) U.S. Cl.
CPC ............ *C04B 35/565* (2013.01); *B32B 18/00* (2013.01); *C04B 35/563* (2013.01);
(Continued)

(58) Field of Classification Search
CPC ............... C04B 35/565; C04B 35/563; C04B 2235/3821; C04B 2235/3826;
(Continued)

(56) References Cited

U.S. PATENT DOCUMENTS 3,796,564 A    3/1974 Taylor et al.
3,852,099 A    12/1974 Prochazka
(Continued)

FOREIGN PATENT DOCUMENTS

CN    1178203 A    4/1998
CN    1552667 A    12/2004
(Continued)

OTHER PUBLICATIONS

"High-performance materials for composite armor systems," 4 pages, Saint-Gobain Ceramic Materials, Niagara Falls, US, 2015.
(Continued)

*Primary Examiner* — Noah S Wiese
(74) *Attorney, Agent, or Firm* — Abel Schillinger, LLP; Adrian Lawrence

(57) ABSTRACT

A ceramic composite can include a first ceramic phase and a second ceramic phase. The first ceramic phase can include a silicon carbide. The second phase can include a boron carbide. In an embodiment, the silicon carbide in the first ceramic phase can have a grain size in a range of 0.8 to 200 microns. The first phase, the second phase, or both can further include a carbon. In another embodiment, at least one of the first ceramic phase and the second ceramic phase can have a median minimum width of at least 5 microns.

20 Claims, 5 Drawing Sheets

Related U.S. Application Data continuation of application No. 15/588,562, filed on May 5, 2017, now Pat. No. 10,189,746.

(60) Provisional application No. 62/332,162, filed on May 5, 2016.

(51) Int. Cl.
| | |
|---|---|
| *F41H 5/04* | (2006.01) |
| *C04B 35/563* | (2006.01) |

(52) U.S. Cl.
CPC .... *F41H 5/0414* (2013.01); *C04B 2235/3821* (2013.01); *C04B 2235/3826* (2013.01); *C04B 2235/422* (2013.01); *C04B 2235/668* (2013.01); *C04B 2235/767* (2013.01); *C04B 2235/77* (2013.01); *C04B 2235/785* (2013.01); *C04B 2235/786* (2013.01); *C04B 2235/80* (2013.01); *C04B 2235/96* (2013.01); *C04B 2237/343* (2013.01); *C04B 2237/36* (2013.01); *C04B 2237/365* (2013.01); *C04B 2237/366* (2013.01); *C04B 2237/368* (2013.01)

(58) Field of Classification Search
CPC .......... C04B 2235/422; C04B 2235/77; C04B 2235/786; C04B 2235/96; C04B 2235/5436
See application file for complete search history.

(56) References Cited

U.S. PATENT DOCUMENTS

| | | | |
|---|---|---|---|
| 4,081,284 A * | 3/1978 | Prochazka | C04B 35/563 |
| | | | 501/91 |
| 4,524,138 A | 6/1985 | Schwetz et al. | |
| 4,525,461 A | 6/1985 | Boecker et al. | |
| 4,756,482 A | 7/1988 | Matje et al. | |
| 5,854,158 A | 12/1998 | Nawa et al. | |
| 5,894,066 A | 4/1999 | Talmy et al. | |
| 6,069,101 A | 5/2000 | Talmy et al. | |
| 6,277,299 B1 | 8/2001 | Seyed-Bolorforosh | |
| 6,862,970 B2 | 3/2005 | Aghajanian et al. | |
| 6,953,760 B2 | 10/2005 | Kutsch et al. | |
| 7,833,921 B2 | 11/2010 | Matsumoto et al. | |
| 2003/0110931 A1 | 6/2003 | Aghajanian et al. | |
| 2003/0195122 A1 | 10/2003 | Demendi et al. | |
| 2009/0256112 A1 | 10/2009 | Shimada et al. | |
| 2010/0319523 A1† | 12/2010 | Bocini | |
| 2011/0175264 A1* | 7/2011 | Pujari | B82Y 30/00 |
| | | | 977/773 |
| 2011/0227259 A1 | 9/2011 | Pujari et al. | |
| 2014/0038808 A1 | 2/2014 | Schenck et al. | |
| 2014/0327163 A1 | 11/2014 | Johannessen et al. | |

FOREIGN PATENT DOCUMENTS

| | | |
|---|---|---|
| CN | 1802334 A | 7/2006 |
| CN | 102219518 A | 10/2011 |
| CN | 102503538 A | 6/2012 |
| CN | 102617148 A | 8/2012 |
| CN | 103540890 A | 1/2014 |
| CN | 105541336 A | 5/2016 |
| EP | 0834484 B1 | 1/2001 |
| JP | S58-204873 A | 11/1983 |
| JP | 2008-297134 A | 12/2008 |
| WO | 2013053892 A1 | 4/2013 |
| WO | 2013188842 A1 | 12/2013 |

OTHER PUBLICATIONS

Zhang et al., "Preparation of B4C-SiC composite ceramics through hot pressing assisted by mechanical alloying," International Journal of Refractory Metals and Hard Materials, Nov. 2013, pp. 270-275, vol. 41, Elsevier Ltd.
International Search Report for PCT/US2017/031452, dated Aug. 16, 2017, 1 page.
Sigl, et al., "Microcracking in B4C-TiB2 Composites", Journal of the American Ceramic Society, Sep. 1995, vol. 78, No. 9, pp. 2374-2380.
Xingcun Tong, "Advanced Materials for Thermal Management of Electronic Packaging" (Chinese), National Defense Industry Press, Apr. 30, 2016, p. 195 (3 pages total).
Lizhai Pei, "High-tech Ceramic Materials" (Chinese), Hefei University of Technology Press, Mar. 31, 2015, p. 108 (3 pages total).
Office Action from Chinese Patent Application No. 2017800361815 dated Dec. 24, 2020, Original + Translation, 22 pages.
Williams et al., Effect of interfacial area on densification and microstructural evolution in silicon carbide-boron carbide particulate composites, J Mater Sci (2016) 51, pp. 353-361, published online Sep. 15, 2015, Springerlink.com.†

* cited by examiner
† cited by third party

MULTI-PHASIC CERAMIC COMPOSITE

CROSS-REFERENCE TO RELATED APPLICATION(S)

This application is a continuation of and claims priority under 35 U.S.C. 120 to U.S. patent application Ser. No. 16/219,380, filed Dec. 13, 2018, entitled "MULTI-PHASIC CERAMIC COMPOSITE," by Diana R. Tierney et al., which is a continuation of and claims priority under 35 U.S.C. 120 to U.S. patent application Ser. No. 15/588,562, filed May 05, 2017, entitled "MULTI-PHASIC CERAMIC COMPOSITE," by Diana R. Tierney et al., which claims priority under 35 U.S.C. 119(e) to U.S. Provisional Patent Application No. 62/332,162, filed May 05, 2016, entitled "MULTI-PHASIC CERAMIC COMPOSITE," by Diana R. Tierney et al., of which all applications are incorporated by reference herein in their entireties.

FIELD OF THE DISCLOSURE

The present disclosure relates to ceramic materials, and methods of making composite ceramic materials, and more particularly to composite ceramic materials having a plurality of continuous phases.

BACKGROUND

A plurality of ceramic materials can be utilized in the formation of dense multi-phase ceramic composite materials. The use of diverse ceramic materials can cause delamination, cracking, and dimensional issues. There exists a need for multi-phase ceramic composite materials exhibiting improved properties.

BRIEF DESCRIPTION OF THE DRAWINGS

Embodiments are illustrated by way of example and are not limited in the accompanying figures.

Figure 1:
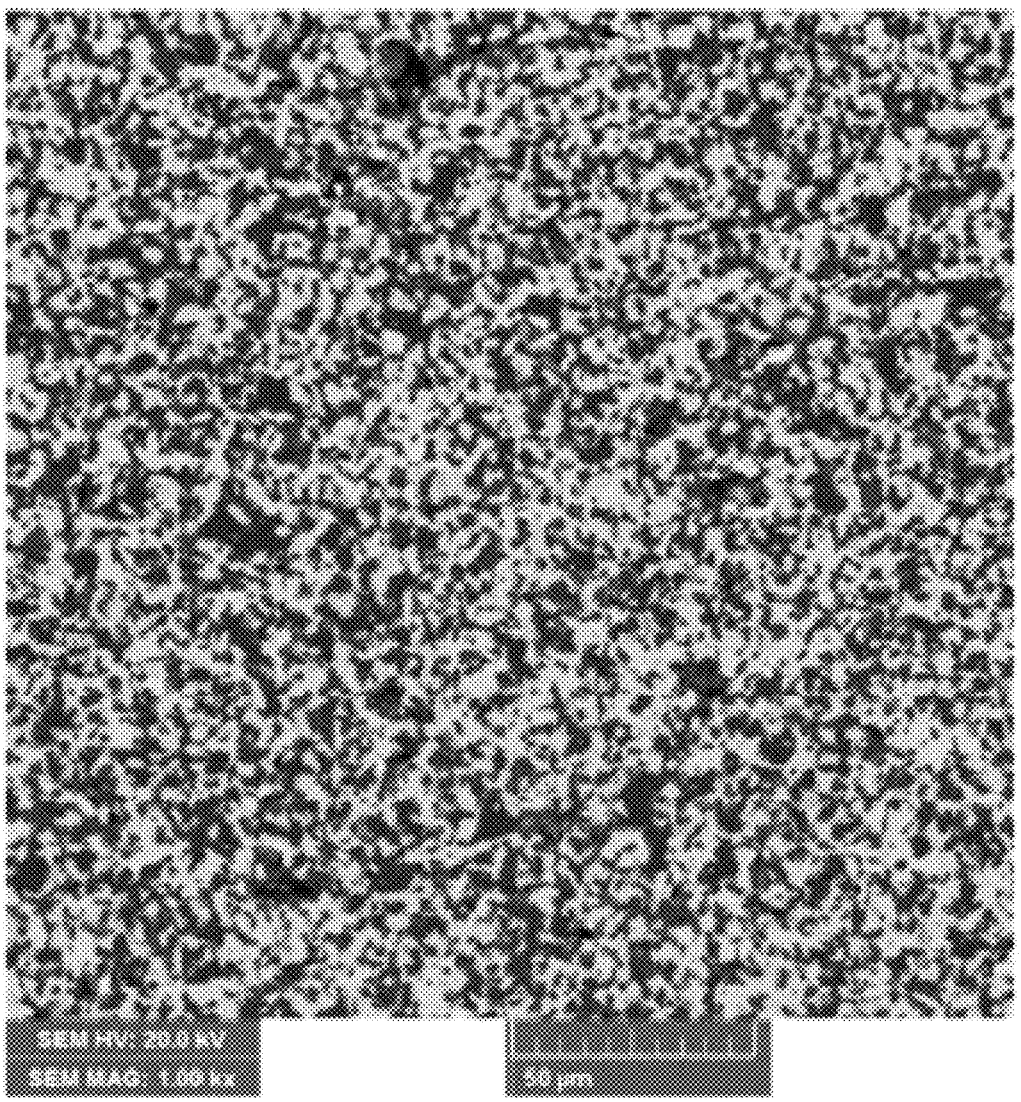
FIG. 1 includes a photograph of a conventional ceramic composite.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "can include," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the ceramic arts.

The ceramic composite described herein can include a biphasic composite having a connectivity between phases that provides an increased stability, meaning that delamination, cracking, and other dimensional issues are reduced or prevented. Further, the unique microstructure of the ceramic composite can include wider phases than conventional ceramic products, as will be discussed in more detail below. Further, the ceramic composite can exhibit high elasticity and high hardness, which increases the scattering of shock waves and makes the ceramic composite an improved ballistic armor material.

The ceramic composite can be a multi-phasic ceramic composite. In certain embodiments, the multi-phasic ceramic composite product can include multiple phases including a first ceramic phase and a second ceramic phase arranged in an advantageous microstructure. Each of the first and second phase can be a continuous phase that extends from one end of the ceramic composite to the other end.

Figure 2:
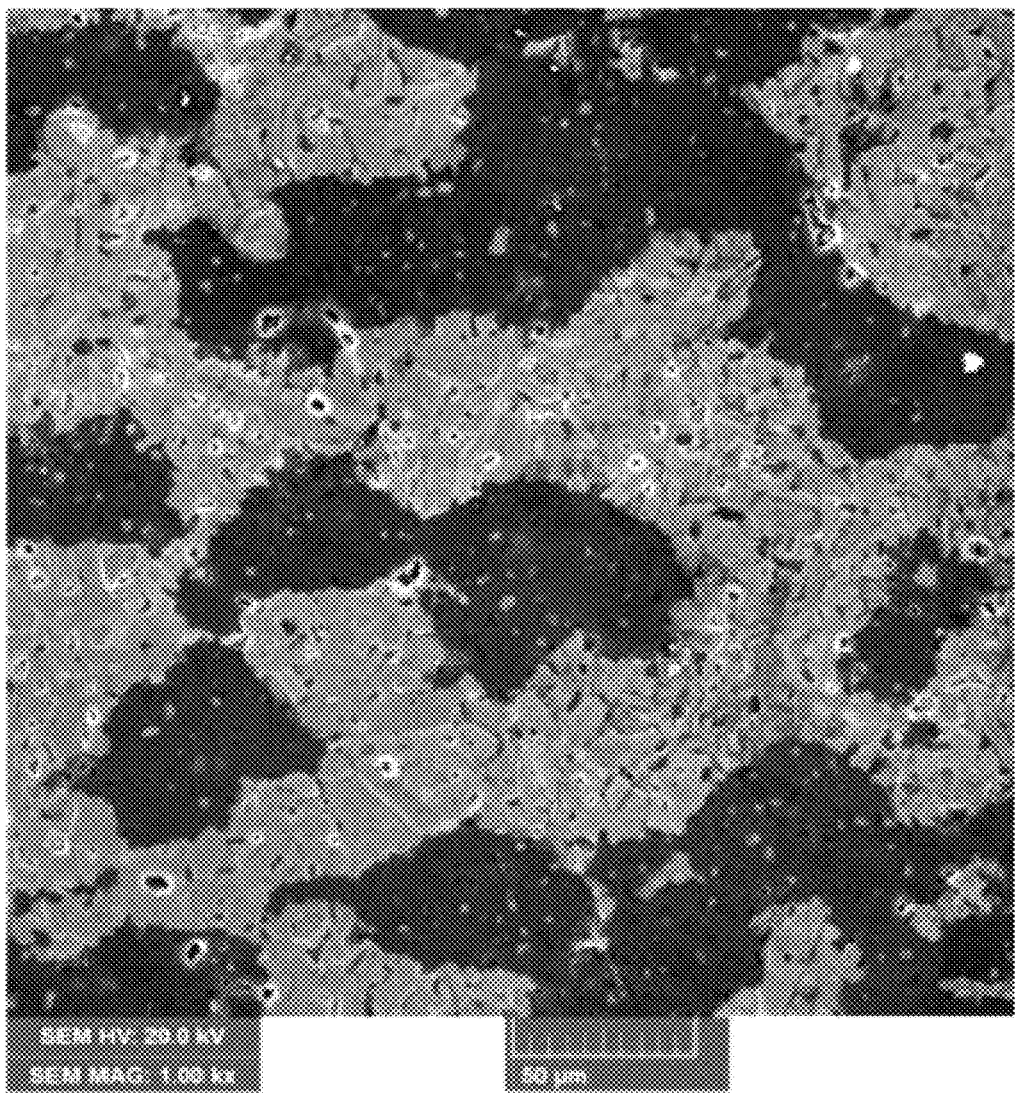
FIG. 2 includes a photograph of a ceramic composite according to an embodiment described herein.

Conventional microstructures of multi-phasic ceramic composites include fine grains dispersed throughout the cross-section, as illustrated in FIG. 1. By contrast, in certain embodiments, the ceramic composite described herein or made according to the method described herein, can achieve a ceramic composite having a unique microstructure, referred to above, as illustrated in FIG. 2. The unique microstructure can include interlocked phases comprising rows of directly adjacent ceramic grains. As used herein, the term "interlocked" refers to a configuration where the first and second ceramic phases are engaged with each other along phase boundaries by overlapping or by the fitting together of the projections and recesses of those phase boundaries.

When combining materials, in addition to selecting component phases which have the desired properties, one must couple the component phases to each other in an optimal manner. Connectivity of the individual phases is a critical parameter in ceramic composites designed for use as ballistic protection because connectivity can affect the mechanical properties such as the ability to scatter shock waves. Each phase in a ceramic composite may be self-connected in zero, one, two or three dimensions. For diphasic ceramic composites, there are ten possible connectivities: 0-0, 0-1, 0-2, 0-3, 1-1, 1-2, 1-3, 2-2, 2-3 and 3-3, where the first number in each pair indicates the number of dimensions of connectivity for the first component phase of a diphasic ceramic composite and the second number in each pair indicates the number of dimensions of connectivity for the second component phase of that diphasic ceramic composite.

For example, the 3-3 connectivity pattern denotes the number of orthogonal directions in which each phase is self-connected. In an embodiment, the ceramic composite can include at least a diphasic ceramic composite having a 3-3 connectivity pattern. In the 3-3 connectivity pattern, two phases form interpenetrating three-dimensional networks, such as when the content ratio of the first phase to the second phase is in a range of 65:35 to 35:65, or in a range of 60:40 to 40:60, or in a range of 55:45 to 45:55, or in a range of 52:48 to 48:52, or even a content ratio of 50:50, based on a total weight of the ceramic composite. In a further embodiment, the connectivity pattern may include a 1-3 connectivity pattern, such as when the content ratio of the first phase to the second phase is in a range of 82:18 to 65:35 or 35:65 to 18:82, or in a range of 80:20 to 65:35 or 35:65 to 20:80, or in a range of 78:22 to 65:35 or 35:65 to 22:78, or in a range of 76:24 to 65:35 or 35:65 to 24:76, or in a range of 74:26 to 65:35 or 35:65 to 26:74, or in a range of 72:28 to 65:35 or 35:65 to 28:72, or in a range of 70:30 to 65:35 or 35:65 to 30:70.

Figure 3A:
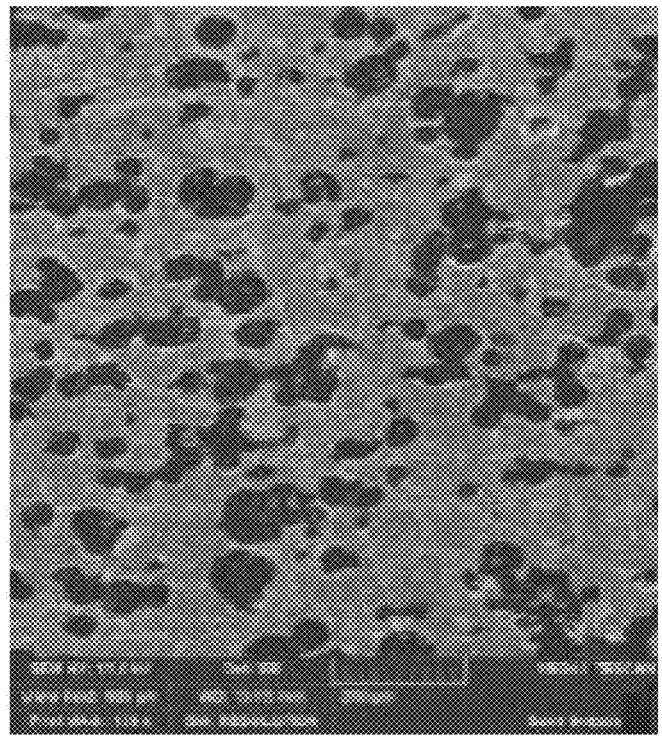
FIG. 3A includes a cross-section image of a ceramic composite according to an embodiment.
Figure 3B:
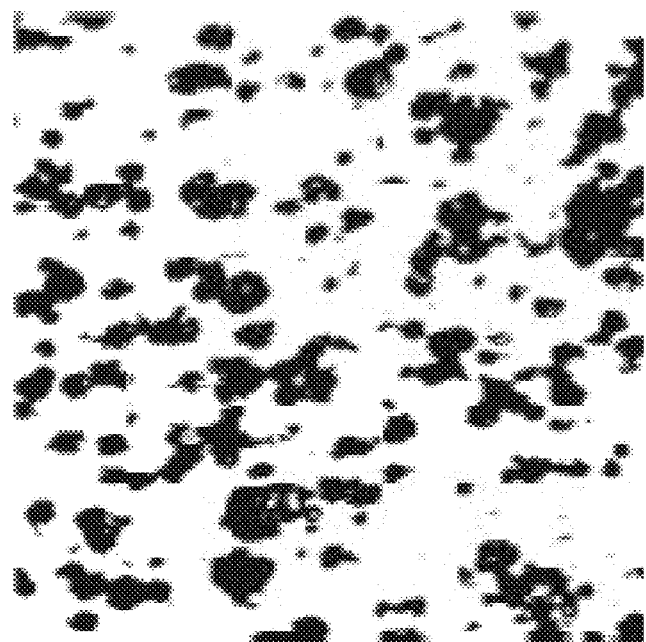
FIG. 3B includes a digital reconstruction of the image of FIG. 3A.

In certain embodiments, the phase boundaries can be controlled so as to have a suitable median minimum width for each phase. A cross-section of the ceramic composite can be prepared for microscopic (e.g., scanning electronic microscope (SEM) or optical microscope) analysis of the microstructure and measurement of the median minimum width of different phases of the ceramic composite. The cross-section can be polished to a final surface finish achieved with a polishing agent including a compound rated at 0.01 μm (from Buehler) and a chemical or electrical based etchant can be utilized to promote contrast at the phase boundaries. When utilizing an SEM, the contrast can be achieved by utilization of a secondary backscatter detector. After preparation, the cross-section can be placed under a microscope with magnification of 50X to 1000X, 30 random fields can be selected, and each field is analyzed by using image analysis software, i-Solution DT-M (from IM Technology) according to the instructions provided by the software for determining the median minimum width of each phase of the ceramic composite. A photograph of a selected field can be taken and used as an original image for subsequent analysis. FIG. 3A includes an exemplary image of a polished and etched cross-section of a ceramic composite. After setting the threshold for automated phase boundary detection, a digital reconstruction of a phase can be generated on a pixel by pixel basis by the software, based on the original image. FIG. 3B includes a digital reconstruction of the phase in the darker color of the image of FIG. 3A. The threshold can be set such that the digital reconstruction of the phase can sufficiently match its original image as close as possible. For instance, by visual inspection, at least 90% of the phase in the original image is captured by the digital reconstruction, and not more than 10% of the neighboring phase is captured by the digital reconstruction. After analyzing the area of the reconstructed phase, a minimum width of the field is calculated and provided by the software, and the median minimum width of the phase is the median value of the minimum width values from the 30 fields. In an embodiment, at least one of the first ceramic phase and the second ceramic phase can have a median minimum width of at least 4 microns, at least 5 microns, or at least 10 microns, or at least 15 microns, or at least 20 microns, or at least 25 microns, or at least 30 microns, or at least 35 microns. In particular embodiments, each of the first ceramic phase and the second ceramic phase can have a median minimum thickness of at least 20 microns, or at least 25 microns, or at least 30 microns, or at least 35 microns. In another embodiment, at least one or each of the first ceramic and second ceramic phases can have a median minimum thickness of at most 200 microns, such as at most 180 microns, or at most 160 microns, or at most 150 microns, or at most 140 microns, or at most 130 microns. Further, at least one or each of the first ceramic and second ceramic phase can have a median minimum thickness in a range including any of the minimum and maximum values noted herein, such as in a range including at least 4 microns and at most 200 microns. In a further embodiment, ceramic composites having different weight contents of first phases and second phases can have similar median minimum thickness of the first phase and similar minimum thickness of the second phase.

In an embodiment, the first phase can be present in the ceramic composite in an amount of at least 1 wt %, or at least 2 wt %, or at least 4 wt %, or at least 5 wt %, or at least 6 wt %, or at least 7 wt %, or at least 8 wt %, or at least 9 wt %, at least 10 wt %, or at least 12 wt %, or at least 15 wt %, or at least 18 wt %, or at least 20 wt %, or at least 22 wt %, or at least 24 wt %, or at least 26 wt %, or at least 28 wt %, or at least 30 wt %, or at least 32 wt % or at least 34 wt %, or at least 36 wt %, or at least 38 wt %, or at least 40 wt %, or at least 42 wt %, or at least 44 wt %, or at least 46 wt %, or at least 48 wt %, or at least 50 wt %, or at least 52 wt %, or at least 55 wt %, or at least 58 wt %, or at least 60 wt %, or at least 62 wt %, or at least 64 wt %, or at least 66 wt %, or at least 68 wt %, or at least 70 wt %, or at least 72 wt %, or at least 75 wt %, or at least 78 wt %, or at least 80 wt %, or at least 82 wt %, or at least 84 wt %, or at least 86 wt %, or at least 88 wt %, or at least 90 wt %, or at least 92 wt %, or at least 94 wt %, or at least 95 wt %, or at least 97 wt %, or at least 98 wt %, or at least 99 wt %, based on a total weight of the ceramic composite. Further, the first phase can be present in the ceramic composite in an amount of at most 99 wt %, at most 98 wt %, or at most 97 wt %, or at most 95 wt %, or at most 92 wt %, at most 90 wt %, or at most 88 wt %, or at most 85 wt %, or at most 82 wt %, or at most 80 wt %, or at most 78 wt %, or at most 76 wt %, or at most 74 wt %, or at most 72 wt %, or at most 70 wt %, or at most 68 wt %, or at most 66 wt %, or at most 64 wt %, or at most 62 wt %, or at most 60 wt %, or at most 58 wt %, or at most 56 wt %, or at most 54 wt %, or at most 52 wt %, or at most 50 wt %, or at most 48 wt %, or at most 46 wt %, or at most 44 wt %, or at most 42 wt %, or at most 40 wt %, or at most 38 wt %, or at most 36 wt %, or at most 34 wt %, or at most 32 wt %, or at most 30 wt %, or at most 28 wt %, or at most 26 wt %, or at most 24 wt %, or at most 22 wt %, or at most 20 wt %, or at most 18 wt %, or at most 16 wt %, or at most 14 wt %, or at most 12 wt %, or at most 10 wt %, or at most 8 wt %, or at most 6 wt %, or at most 4 wt %, or at most 2 wt %, or at most 1 wt %, based on a total weight of the ceramic composite. Moreover, the first phase can be present in the ceramic composite in an amount including any of the minimum and maximum percentages noted herein. For instance, the first phase can be present in the ceramic composite in an amount in a range of at least 1 wt % to at most 99 wt % or in a range of at least 8 wt % to at most 92 wt % or in a range of at least 10 wt % to at most 90 wt % or in a range of at least 30 wt % to at most 70 wt %.

In an embodiment, the ceramic composite can include a silicon carbide. In a further embodiment, the total amount of silicon carbide present in the ceramic composite can be at least 1 wt %, or at least 2 wt %, or at least 3 wt %, or at least 4 wt %, or at least 5 wt %, or at least 6 wt %, or at least 7 wt %, or at least 8 wt %, or at least 9 wt %, or at least 10 wt %, or at least 11 wt %, or at least 13 wt %, or at least 14 wt %, or at least 15 wt %, or at least 17wt %, or at least 18 wt %, or at least 20 wt %, or at least 22 wt %, or at least 24 wt %, or at least 26 wt %, or at least 28 wt %, or at least 30 wt %, or at least 32 wt % or at least 34 wt %, or at least 36 wt %, or at least 38 wt %, or at least 40 wt %, or at least 42 wt %, or at least 44 wt %, or at least 46 wt %, or at least 48 wt %, or at least 50 wt %, or at least 52 wt %, or at least 55 wt %, or at least 58 wt %, or at least 60 wt %, or at least 62 wt %, or at least 64 wt %, or at least 66 wt %, or at least 68 wt %, or at least 70 wt %, or at least 72 wt %, or at least 75 wt %, or at least 78 wt %, or at least 80 wt %, or at least 82 wt %, or at least 84 wt %, or at least 86 wt %, or at least 88 wt %, or at least 90 wt %, or at least 92 wt %, or at least 94 wt %, or at least 95 wt %, or at least 97 wt %, or at least 98 wt %, or at least 99 wt %, based on a total weight of the ceramic composite. Further, the total amount of silicon carbide present in the ceramic composite can be at most 99 wt %, at most 98 wt %, or at most 97 wt %, or at most 95 wt %, or at most 92 wt %, at most 90 wt %, or at most 88 wt %, or at most 85 wt %, or at most 82 wt %, or at most 80 wt %, or at most 78 wt %, or at most 76 wt %, or at most 74 wt %, or at most 72 wt %, or at most 70 wt %, or at most 68 wt %, or at most 66 wt %, or at most 64 wt %, or at most 62 wt %, or at most 60 wt %, or at most 58 wt %, or at most 56 wt %, or at most 54 wt %, or at most 52 wt %, or at most 50 wt %, or at most 48 wt %, or at most 46 wt %, or at most 44 wt %, or at most 42 wt %, or at most 40 wt %, or at most 38 wt %, or at most 36 wt %, or at most 34 wt %, or at most 32 wt %, or at most 30 wt %, or at most 28 wt %, or at most 26 wt %, or at most 24 wt %, or at most 22 wt %, or at most 20 wt %, or at most 18 wt %, or at most 16 wt %, or at most 14 wt %, or at most 12 wt %, or at most 10 wt %, or at most 8 wt %, or at most 6 wt %, or at most 4 wt %, or at most 2 wt %, or at most 1 wt %, based on a total weight of the ceramic composite. Moreover, the total amount of silicon carbide present in the ceramic composite can include any of the minimum and maximum percentages noted herein. For instance, the total amount of silicon carbide present in the ceramic composite can be in a range of at least 1 wt % to at most 99 wt % or in a range of at least 10 wt % to at most 90 wt % or in a range of at least 15 wt % to at most 85 wt % or in a range of at least 30 wt % to at most 70 wt %.

In an embodiment, the first ceramic phase can include a silicon carbide. The silicon carbide of the first phase can include α-SiC, 15R-SiC, 3C-SiC, or any combination thereof. In an embodiment, the first phase can include the silicon carbide in an amount of at least 50 wt %. In another embodiment, the silicon carbide can be present in the first phase in an amount greater than 50 wt %, such as at least 52 wt %, or at least 55 wt %, or at least 58 wt %, or at least 60 wt %, or at least 63 wt %, or at least 65 wt %, or at least 67 wt %, or at least 68 wt %, or at least 70 wt %, or at least 72 wt %, or at least 75 wt %, or at least 78 wt %, or at least 80 wt %, or at least 83 wt %, or at least 86 wt %, at least 88 wt %, or at least 90 wt %, or at least 91 wt %, or at least 92 wt %, or at least 93 wt %, or at least 94 wt %, or at least 95 wt %, or at least 96 wt %, or at least 97 wt %, or at least 98 wt %, or at least 99 wt %, or at least 99.1 wt %, or at least 99.2 wt %, or at least 99.25 wt %, or at least 99.3 wt %, or at least 99.4 wt %, or at least 99.5 wt %, or at least 99.6 wt %, or at least 99.7 wt %, or at least 99.75 wt %, or at least 99.8 wt %, or at least 99.9 wt %, based on a total weight of the first phase. In a further embodiment, the first phase can include the silicon carbide in an amount of at most 99.99 wt %, or at most 99.95 wt %, or at most 99.92 wt %, or at most 99.9 wt %, or at most 99.8 wt %, or at most 99.75 wt %, or at most 99.7 wt %, or at most 99.6 wt %, or at most 99.5 wt %, or at most 99.4 wt %, or at most 99.3 wt %, or at most 99.25 wt %, or at most 99.2 wt %, or at most 99.1 wt %, or at most 99 wt %, or at most 98 wt %, or at most 97 wt %, or at most 96 wt %, or at most 95 wt %, or at most 94 wt %, or at most 93 wt %, or at most 92 wt %, or at most 91 wt %, or at most 90 wt %, based on a total weight of the first phase. In an embodiment, the first phase can include the silicon carbide in an amount in a range including any of the above minimum and maximum percentages, such as in a range of 50 wt % to 99.99 wt %, or in a range of 86 wt % to 99.99 wt %, or in a range of 88 wt % to 99.95 wt %, or in a range of 90 wt % to 99 wt %.

In a particular embodiment, the silicon carbide present in the first ceramic phase can have a certain average grain size that can facilitate improved formation and performance of the ceramic composite. For instance, the average grain size of silicon carbide in the first ceramic phase can be at least 0.3 microns, at least 0.5 microns, at least 0.8 microns, such as at least 0.9 microns, or at least 1 micron, or at least 1.2 microns, or at least 1.5 microns, or at least 1.8 microns, or at least 2 microns, or at least 2.1 microns, or at least 2.3 microns, or at least 2.5 microns, or at least 2.8 microns, or at least 3 microns, or at least 3.1 microns, or at least 3.3 microns, or at least 3.5 microns, or at least 3.8 microns, or at least 3.9 microns, or at least 4.1 microns, or at least 4.3 microns, or at least 4.5 microns, or at least 4.8 microns, or at least 5 microns, or at least 5.2 microns, or at least 5.3 microns, or at least 5.5 microns, or at least 5.8 microns, or at least 6 microns, or at least 6.2 microns, or at least 6.5 microns, or at least 6.8 microns, or at least 7 microns, or at least 7.3 microns, or at least 7.5 microns, or at least 8.1 microns, or at least 8.5 microns, or at least 9 microns, or at least 9.3 microns, or at least 9.5 microns, or at least 9.7 microns, or at least 10 microns, or at least 10.5 microns. In another particular embodiment, the average grain size of silicon carbide in the first ceramic phase can be at most 200 microns, such as at most 190 microns, at most 180 microns, at most 175 microns, at most 170 microns, at most 165 microns, at most 160 microns, at most 150 microns, at most 145 microns, or at most 140 microns, or at most 130 microns, or at most 125 microns, or at most 120 microns, or at most 110 microns, or at most 100 microns, or at most 95 microns, or at least 90 microns, or at most 80 microns. Moreover, silicon carbide in the first ceramic phase can have an average grain size in a range including any of the minimum and maximum values noted herein. For instance, the first ceramic phase can include silicon carbide having an average grain size in a range including at least 0.3 microns and at most 200 microns, or in a range including at least 1 microns and at most 200 microns, or in a range including at least 5 microns and at most 200 microns, or in a range of 1 to 150 microns.

In these and other embodiments, the first phase can also include a boron carbide, a carbon, or both. In an embodiment, the first phase can include boron carbide, carbon, or both, in an amount of at least 0.05 wt %, or 0.07 wt %, or at least 0.1 wt %, or at least 0.2 wt %, or at least 0.25 wt %, or at least 0.3 wt %, or at least 0.4 wt %, or at least 0.5 wt %, or at least 0.6 wt %, or at least 0.7 wt %, or at least 0.75 wt %, or at least 0.8 wt %, or at least 0.9 wt %, or at least 1 wt %, or at least 1.2 wt %, or at least 1.4 wt %, or at least 1.5 wt %, or at least 1.7 wt %, or at least 1.9 wt %, or at least 2 wt %, or at least 2.2 wt %, or at least 2.4 wt %, or at least 2.5 wt %, or at least 2.7 wt %, or at least 2.9 wt %, or at least 3 wt %, or at least 3.2 wt %, or at least 3.4 wt %, or at least 3.5 wt %, or at least 3.7 wt %, or at least 3.9 wt %, or at least 4 wt %, or at least 4.2 wt %, or at least 4.4 wt %, or at least 4.5 wt %, or at least 4.7 wt %, or at least 4.9 wt %, or at least 5 wt %, or at least 5.2 wt %, or at least 5.5 wt %, or at least 5.7 wt %, or at least 5.9 wt %, or at least 6 wt %, or at least 6.4 wt %, or at least 6.7 wt %, or at least 7 wt %, or at least 7.2 wt %, or at least 7.5 wt %, or at least 7.7 wt %, or at least 8 wt %, or at least 8.4 wt %, or at least 8.7 wt %, or at least 9 wt %, or at least 9.2 wt %, or at least 9.4 wt %, or at least 9.7 wt %, or at least 10 wt %, for the total weight of the first phase. In another embodiment, the first phase can include a boron carbide, a carbon, or both, in an amount of at most 12 wt %, or at most 11 wt %, or at most 10.5 wt %, or at most 10 wt %, or at most 9 wt %, or at most 8 wt %, or at most 7 wt %, or at most 6 wt %, or at most 5 wt %, or at most 4 wt %, or at most 3 wt %, or at most 2 wt %, or at most 1 wt %. In an embodiment, the first phase can include a boron carbide, a carbon, or both, in a range including any of the above minimum and maximum percentages, such as in a range of 0.05 wt % to 12 wt %, or in a range of 0.07 wt % to 11 wt %, or in a range of 0.09 to 10.5 wt %.

For example, in a particular embodiment, the first phase can include boron carbide. Boron carbide can be present in the second phase in an amount of at most 10 wt %, such as at most 9.8 wt %, or at most 9.5 wt %, or at most 9.2 wt %, or at most 9 wt %, or at most 8.8 wt %, or at most 8.5 wt %, or at most 8.2 wt %, or at most 8 wt %, or at most 7.8 wt %, or at most 7.5 wt %, or at most 7.3 wt %, or at most 7.2 wt %, or at most 7 wt %, at most 6.8 wt %, or at most 6.5 wt %, or at most 6.3 wt %, or at most 6 wt %, or at most 5.8 wt %, or at most 5.5 wt %, or at most 5.2 wt %, or at most 5 wt %, or at most 4.8 wt %, or at most 4.5 wt %, or at most 4.2 wt %, or at most 4 wt %, or at most 3.8 wt %, or at most 3.5 wt %, or at most 3.2 wt %, or at most 3 wt %, or at most 2.8 wt %, or at most 2.5 wt %, or at most 2.2 wt %, or at most 2 wt %, or at most 1.8 wt %, or at most 1.5 wt %, or at most 1.2 wt %, or at most 1 wt %, or at most 0.9 wt %, or at most 0.8 wt %, or at most 0.7 wt %, or at most 0.6 wt %, or at most 0.5 wt %, or at most 0.4 wt %, or at most 0.3 wt %, or at most 0.25 wt %, or at most 0.2 wt %, or at most 0.1 wt %, based on a total weight of the first phase. In another particular embodiment, the first phase can include boron carbide in an amount of at least 0.1 wt %, or at least 0.2 wt %, or at least 0.3 wt %, or at least 0.4 wt %, or at least 0.5 wt %, or at least 0.6 wt %, or at least 0.7 wt %, or at least 0.75 wt %. or at least 0.8 wt %, or at least 0.9 wt %, or at least 1 wt %, or at least 1.2 wt %, or at least 1.4 wt %, or at least 1.5 wt %, or at least 1.7 wt %, or at least 1.9 wt %, or at least 2 wt %, or at least 2.2 wt %, or at least 2.4 wt %, or at least 2.5 wt %, or at least 2.7 wt %, or at least 2.9 wt %, or at least 3 wt %, or at least 3.2 wt %, or at least 3.4 wt %, or at least 3.5 wt %, or at least 3.7 wt %, or at least 3.9 wt %, or at least 4 wt %, or at least 4.2 wt %, or at least 4.4 wt %, or at least 4.5 wt %, or at least 4.7 wt %, or at least 4.9 wt %, or at least 5 wt %, or at least 5.2 wt %, or at least 5.5 wt %, or at least 5.7 wt %, or at least 5.9 wt %, or at least 6 wt %, or at least 6.4 wt %, or at least 6.7 wt %, or at least 7 wt %, or at least 7.2 wt %, or at least 7.5 wt %, or at least 7.7 wt %, or at least 8 wt %, or at least 8.4 wt %, or at least 8.7 wt %, or at least 9 wt %, or at least 9.2 wt %, or at least 9.4 wt %, or at least 9.7 wt %, or at least 10 wt %, based on a total weight of the first phase. Further, the first phase can include boron carbide in a range including any of the minimum or maximum percentages noted herein. For instance, boron carbide can be present in the first phase in an amount including at least 0.1 wt % and at most 10 wt % for the total weight of the first phase.

The boron carbide grains in the first phase can have a certain average grain size that can facilitate formation and improved performance of the ceramic composite. For instance, the boron carbide grains in the first phase can have an average grain size of at least 0.3 microns, or at least 0.5 microns, or at least 0.6 microns, or at least 0.8 microns, such as at least 0.9 microns, or at least 1 micron, or at least 1.2 microns, or at least 1.5 microns, or at least 1.8 microns, or at least 2 microns, or at least 2.1 microns, or at least 2.3 microns, or at least 2.5 microns, or at least 2.8 microns, or at least 3 microns, or at least 3.1 microns, or at least 3.3 microns, or at least 3.5 microns, or at least 3.8 microns, or at least 3.9 microns, or at least 4.1 microns, or at least 4.3 microns, or at least 4.5 microns, or at least 4.8 microns, or at least 5 microns or at least 5.2 microns, or at least 5.5 microns, or at least 6 microns, or at least 6.3 microns, or at least 6.5 microns, or at least 7 microns, or at least 7.5 microns, or at least 8 microns, or at least 8.5 microns, or at least 9 microns, or at least 9.5 microns, or at least 9.8 microns, or at least 10 microns, or at least 12 microns, or at least 16 microns, or at least 20 microns, or at least 25 microns, or at least 30 microns, or at least 35 microns. In another instance, the boron carbide grains in the first phase can have an average grain size of at most 200 microns, such as at most 180 microns, at most 150 microns, at most 130 microns or at most 100 microns, or at most 95 microns, or at most 90 microns, or at most 85 microns, or at most 80 microns, or at most 75 microns, or at most 70 microns, or at most 65 microns, or at most 60, at most 55 microns, at most 50 microns, or at most 46 microns, or at most 40 microns, or at most 35 microns, or at most 30 microns, or at most 25 microns, or at most 20 microns, or at most 15 microns, or at most 10 microns, or at most 8 microns, or at most 6 microns, or at most 5 microns. Moreover, boron carbide grains in the first phase can have an average grain size in a range including any of the minimum and maximum values disclosed herein. For instance, boron carbide grains in the first phase can have an average grain size in a range of 0.3 to 200 microns or in a range of 5 to 200 microns or in a range of 0.5 to 100 microns or in a range of at most 2 microns to 85 microns.

Furthermore, in a particular embodiment, the first phase can include elemental carbon in an amount of at most 7 wt %, or at most 6 wt %, or at most 5 wt %, or at most 4.5 wt %, or at most 4 wt %, or at most 3.5 wt %, or at most 3 wt %, or at most 2.5 wt %, or at most 2 wt %, or at most 1.5 wt %, or at most 1 wt %, based on a total weight of the first phase. In another particular embodiment, the first phase can include elemental carbon in an amount of at least 0.05 wt %, such as at least 0.07 wt %, or at least 0.09 wt %, or at least 1 wt %, or at least 1.2 wt %, or at least 1.5 wt %, or at least 2 wt %, or at least 2.2 wt %, or at least 2.5 wt %, or at least 2.8 wt %, or at least 3 wt %, or at least 3.2 wt %, or at least 3.5 wt %, or at least 3.8 wt %, or at least 4 wt %, or at least 4.3 wt %, or at least 4.7 wt %, or at least 5 wt % for a total weight of the first phase. Further, the first phase can include elemental carbon in a range including any of the minimum or maximum percentages noted herein. For instance, the elemental carbon can be present in the first phase in an amount including at least 0.05 wt % and at most 7 wt % for the total weight of the first phase.

In a further embodiment, the first phase can include elemental carbon having a grain size of at least 0.3 microns, such as at least 0.5 microns, or at least 0.7 microns, or at least 0.9 microns, or at least 1 microns, or at least 1.4 microns, or at least 1.8 microns, at least 2 microns, or at least 2.5 microns, such as at least 2.7 microns, at least 2.9 microns, or at least 3.5 microns, or at least 4 microns, or at least 4.5 microns, or at least 5 microns, or at least 7 microns, or at least 8 microns, or at least 9 microns, or at least 10 microns. In another embodiment, the elemental carbon in the first phase can have a grain size of at most 100 microns, such as at most 90 microns, at most 80 microns, at most 75 microns, at most 70 microns, at most 65 microns, at most 60 microns, at most 50 microns, at most 45 microns, or at most 40 microns, or at most 30 microns, or at most 25 microns, or at most 20 microns, or at most 10 microns. Moreover, the elemental carbon in the first ceramic phase can have a grain size in a range including any of the minimum and maximum values noted herein. For instance, the first ceramic phase can include elemental carbon having a size in a range of 0.3 to 100 microns or in a range of 0.5 microns to 80 microns.

In a particular embodiment, the first phase can include silicon carbide and boron carbide. In a more particular embodiment, silicon carbide and boron carbide can be present in the first phase in the amount noted in this disclosure with respect to each compound. For instance, the first phase can include silicon carbide in an amount of about 99.9 wt %, 99.8 wt %, 99.75 wt %, 99.7 wt %, 99.6 wt %, 99.5 wt %, 99.4 wt %, 99.3 wt %, 99.25 wt %, 99.2 wt %, 99.1 wt %, 99 wt %, 98 wt %, 97 wt %, 96 wt %, 95 wt %, 94 wt %, 93 wt %, 92 wt %, 91 wt %, or 90 wt %, and ranges there between, and boron carbide in an amount of about 0.1 wt %, 0.2 wt %, 0.25 wt %, 0.3 wt %. 0.4 wt %, 0.5 wt %, 0.6 wt %. 0.7 wt %, 0.75 wt %. 0.8 wt % or 0.9 wt %, 1 wt % , 2 wt %, 3 wt %, 4 wt %, 5 wt %, 6 wt %, 7 wt %, 8, wt %, 9 wt % or 10 wt %. Further, the first phase can include silicon carbide and boron carbide in a range of any of the above values as minimum or maximum.

In an embodiment, the second phase can be present in the ceramic composite in an amount of at least 1 wt %, or at least 1.3 wt %, or at least 2 wt %, or at least 2.5 wt %, or at least 3 wt %, or at least 4 wt %, or at least 5 wt %, or at least 6 wt %, or at least 7 wt %, or at least 8 wt %, or at least 9 wt %, or at least 10 wt %, or at least 11 wt %, or at least 13 wt %, or at least 15 wt %, or at least 17wt %, or at least 18 wt %, or at least 20 wt %, or at least 22 wt %, or at least 24 wt %, or at least 26 wt %, or at least 28 wt %, or at least 30 wt %, or at least 32 wt % or at least 34 wt %, or at least 36 wt %, or at least 38 wt %, or at least 40 wt %, or at least 42 wt %, or at least 44 wt %, or at least 46 wt %, or at least 48 wt %, or at least 50 wt %, or at least 52 wt %, or at least 55 wt %, or at least 58 wt %, or at least 60 wt %, or at least 62 wt %, or at least 64 wt %, or at least 66 wt %, or at least 68 wt %, or at least 70 wt %, or at least 72 wt %, or at least 75 wt %, or at least 78 wt %, or at least 80 wt %, or at least 82 wt %, or at least 84 wt %, or at least 86 wt %, or at least 88 wt %, or at least 90 wt %, or at least 92 wt %, or at least 93 wt %, or at least 94 wt %, or at least 96 wt %, or at least 99 wt %, based on a total weight of the ceramic composite. Further, the second phase can be present in the ceramic composite in an amount of at most 99 wt %, at most 98 wt %, or at most 97 wt %, or at most 95 wt %, or at most 92 wt %, or at most 90 wt %, or at most 88 wt %, or at most 85 wt %, or at most 82 wt %, or at most 80 wt %, or at most 78 wt %, or at most 76 wt %, or at most 74 wt %, or at most 72 wt %, or at most 70 wt %, or at most 68 wt %, or at most 66 wt %, or at most 64 wt %, or at most 62 wt %, or at most 60 wt %, or at most 58 wt %, or at most 56 wt %, or at most 54 wt %, or at most 52 wt %, or at most 50 wt %, or at most 52 wt %, or at most 50 wt %, or at most 48 wt %, or at most 46 wt %, or at most 44 wt %, or at most 42 wt %, or at most 40 wt %, or at most 38 wt %, or at most 36 wt %, or at most 34 wt %, or at most 32 wt %, or at most 30 wt %, or at most 28 wt %, or at most 26 wt %, or at most 24 wt %, or at most 22 wt %, or at most 20 wt %, or at most 18 wt %, or at most 16 wt %, or at most 14 wt %, or at most 12 wt %, or at most 10 wt %, or at most 8 wt %, or at most 6 wt %, or at most 4 wt %, or at most 3 wt %, or at most 2 wt %, or at most 1 wt %, based on a total weight of the ceramic composite. Moreover, the second phase can be present in the ceramic composite in an amount including any of the minimum and maximum percentages noted herein. For instance, the second phase can be present in the ceramic composite in an amount in a range of at least 1 wt % to at most 99 wt % or in a range of at least 8 wt % to at most 92 wt % or in a range of at least 10 wt % to at most 90 wt %.

In an embodiment, the total amount of boron carbide present in the ceramic composite can be at least 1 wt %, or at least 2 wt %, or at least 3 wt %, or at least 4 wt %, or at least 5 wt %, or at least 6 wt %, or at least 7 wt %, or at least 8 wt %, or at least 9 wt %, or 10 wt %, or at least 11 wt %, or at least 13 wt %, or at least 15 wt %, or at least 17wt %, or at least 18 wt %, or at least 20 wt %, or at least 22 wt %, or at least 24 wt %, or at least 26 wt %, or at least 28 wt %, or at least 30 wt %, or at least 32 wt % or at least 34 wt %, or at least 36 wt %, or at least 38 wt %, or at least 40 wt %, or at least 42 wt %, or at least 44 wt %, or at least 46 wt %, or at least 48 wt %, or at least 50 wt %, or at least 52 wt %, or at least 55 wt %, or at least 58 wt %, or at least 60 wt %, or at least 62 wt %, or at least 64 wt %, or at least 66 wt %, or at least 68 wt %, or at least 70 wt %, or at least 72 wt %, or at least 75 wt %, or at least 78 wt %, or at least 80 wt %, or at least 82 wt %, or at least 84 wt %, or at least 86 wt %, or at least 88 wt %, or at least 90 wt %, or at least 92 wt %, or at least 93 wt %, or at least 94 wt %, or at least 96 wt %, or at least 99 wt %, based on a total weight of the ceramic composite. Further, the total amount of boron carbide present in the ceramic composite can be at most 99 wt %, at most 98 wt %, or at most 97 wt %, or at most 95 wt %, or at most 92 wt %, at most 90 wt %, or at most 88 wt %, or at most 85 wt %, or at most 82 wt %, or at most 80 wt %, or at most 78 wt %, or at most 76 wt %, or at most 74 wt %, or at most 72 wt %, or at most 70 wt %, or at most 68 wt %, or at most 66 wt %, or at most 64 wt %, or at most 62 wt %, or at most 60 wt %, or at most 58 wt %, or at most 56 wt %, or at most 54 wt %, or at most 52 wt %, or at most 50 wt %, or at most 48 wt %, or at most 46 wt %, or at most 44 wt %, or at most 42 wt %, or at most 40 wt %, or at most 38 wt %, or at most 36 wt %, or at most 34 wt %, or at most 32 wt %, or at most 30 wt %, or at most 28 wt %, or at most 26 wt %, or at most 24 wt %, or at most 22 wt %, or at most 20 wt %, or at most 18 wt %, or at most 16 wt %, or at most 14 wt %, or at most 12 wt %, or at most 10 wt %, or at most 9 wt %, or at most 8 wt %, or at most 6 wt %, or at most 4 wt %, or at most 2 wt %, or at most 1 wt %, based on a total weight of the ceramic composite. Moreover, the total amount of boron carbide present in the ceramic composite can include any of the minimum and maximum percentages noted herein. For instance, the total amount of boron carbide present in the ceramic composite can be in a range of at least 1 wt % to at most 99 wt % or in a range of at least 10 wt % to at most 90 wt %.

In an embodiment, the second ceramic phase can include a boron carbide. In an embodiment, the second phase can include boron carbide in an amount of at least 50 wt % based on a total weight of the second phase. In another embodiment, the second phase can include greater than 50 wt % of boron carbide based on a total weight of the second phase, such as at least 52 wt %, or at least 55 wt %, or at least 58 wt %, or at least 60 wt %, or at least 63 wt %, or at least 65 wt %, or at least 67 wt %, or at least 68 wt %, or at least 70 wt %, or at least 72 wt %, or at least 75 wt %, or at least 78 wt %, or at least 80 wt %, or at least 83 wt %, or at least 86 wt %, or at least 88 wt %, or at least 90 wt %, or at least 91 wt %, or at least 92 wt %, or at least 93 wt %, or at least 94 wt %, or at least 95 wt %, or at least 96 wt %, or at least 97 wt %, or at least 98 wt %, or at least 99 wt %, or at least 99.1 wt %, or at least 99.2 wt %, or at least 99.25 wt %, or at least 99.3 wt %, or at least 99.4 wt %, or at least 99.5 wt %, or at least 99.6 wt %, or at least 9.7 wt %, or at least 99.75 wt %, or at least 99.8 wt %, or at least 99.9 wt %, based on a total weight of the second phase. Further, in an embodiment, the second phase can include boron carbide in an amount of at most 99.9 wt %, or at most 99.8 wt %, or at most 99.75 wt %, or at most 99.7 wt %, or at most 99.6 wt %, or at most 99.5 wt %, or at most 99.4 wt %, or at most 99.3 wt %, or at most 99.25 wt %, or at most 99.2 wt %, or at most 99.1 wt %, or at most 99 wt %, or at most 98 wt %, or at most 97 wt %, or at most 96 wt %, or at most 95 wt %, or at most 94 wt %, or at most 93 wt %, or at most 92 wt %, or at most 91 wt %, or at most 90 wt %, based on a total weight of the second phase. In an embodiment, the first phase can include boron carbide in an amount in a range of any of the above minimum and maximum values. For instance, the first phase can include boron carbide in an amount in a range of 86 wt % to 99.99 wt %, or 88 wt % to 99.95 wt %, or 90 wt % to 99 wt %.

In a particular embodiment, the second phase can include boron carbide having a certain average grain size that can facilitate improved formation and performance of the ceramic composition. For instance, the average grain size of boron carbide in the second phase can be at least 0.3 microns, such as at least 0.4 microns, or at least 0.5 microns, or at least 0.6 microns, or at least 0.7 microns, or at least 0.8 microns, or at least 0.9 microns, or at least 1 micron, or at least 1.2 microns, or at least 1.4 microns, or at least 1.6 microns, or at least 1.8 microns, or at least 1.9 microns, or at least 2 microns, or at least 2.2 microns, or at least 2.4 microns, or at least 2.6 microns, or at least 2.8 microns, or at least 2.9 microns, or at least 3 microns, or at least 3.2 microns, or at least 3.4 microns, or at least 3.6 microns, or at least 3.8 microns, or at least 3.9 microns, or at least 4 microns, or at least 4.2 microns, or at least 4.4 microns, or at least 4.6 microns, or at least 4.8 microns, or at least 5 microns, or at least 5.2 microns, or at least 5.5 microns, or at least 6 microns, or at least 6.3 microns, or at least 6.5 microns, or at least 7 microns, or at least 7.5 microns, or at least 8 microns, or at least 8.5 microns, or at least 9 microns, or at least 9.5 microns, or at least 9.8 microns, or at least 10 microns, or at least 12 microns, or at least 16 microns, or at least 20 microns, or at least 25 microns, or at least 30 microns, or at least 35 microns. In another instance, the average grain size of boron carbide in the second phase can be at most 200 microns, such as at most 180 microns, at most 150 microns, at most 130 microns, or at most 100 microns, or most 95 microns, or at most 90 microns, or at most 85 microns, or at most 80 microns, or at most 75 microns, or at most 70 microns, or at most 65 microns, or at most 60, at most 55 microns, at most 50 microns, or at most 46 microns, or at most 40 microns, or at most 35 microns, or at most 30 microns, or at most 25 microns, or at most 20 microns, or at most 15 microns, or at most 10 microns, or at most 8 microns, or at most 6 microns, or at most 5 microns, or at most 4.8 microns, or at most 4.6 microns, or at most 4.4 microns, or at most 4.1 microns, or at most 3.9 microns, or at most 3.7 microns, or at most 3.5 microns, or at most 3.3 microns, or at most 3.1 microns. In a particular embodiment, the boron carbide can have an average grain size in a range including any of the minimum and maximum values disclosed herein, such as in a range of 0.3 to 200 microns, or in a range of 0.5 to 100 microns or in a range of 2 to 85 microns.

In a further embodiment, the second phase can also include a silicon carbide, a carbon, or both. In an embodiment, the second phase can include silicon carbide, carbon, or both, in an amount of at least 0.05 wt %, or at least 0.07 wt %, or at least 0.09 wt %, or at least 0.1 wt %, or at least 0.2 wt %, or at least 0.25 wt %, or at least 0.3 wt %, or at least 0.4 wt %, or at least 0.5 wt %, or at least 0.6 wt %, or at least 0.7 wt %, or at least 0.75 wt %, or at least 0.8 wt %, or at least 0.9 wt %, or at least 1 wt %, or at least 2 wt %, or at least 3 wt %, or at least 4 wt %, or at least 5 wt %, or at least 6 wt %, or at least 7 wt %, or at least 8 wt %, or at least 9 wt %, or at least 10 wt %. In an embodiment, the second phase can include silicon carbide, carbon, or both, in an amount of at most 12 wt %, or at most 11 wt %, or at most 10.5 wt %, or at most 10 wt %, at most 9 wt %, or at most 8 wt %, or at most 7 wt %, or at most 6 wt %, or at most 5 wt %, or at most 4 wt %, or at most 3 wt %, or at most 2 wt %, or at most 1 wt %, or at most 0.9 wt %, or at most 0.8 wt %, or at most 0.7 wt %, or at most 0.6 wt %, or at most 0.5 wt %, or at most 0.4 wt %, or at most 0.3 wt %, or at most 0.25 wt %, or at most 0.2 wt %, or at most 0.1 wt %, based on the total weight of the second phase. In an embodiment, the second phase can include a silicon carbide, a carbon, or both, in a range including any of the minimum and maximum percentages noted herein, such as in a range of 0.05 wt % to 12 wt %, or in a range of 0.07 wt % to 11 wt %, or in a range of 0.09 to 10.5 wt %.

For example, in a particular embodiment, the silicon carbide in the second phase can include β-SiC. In a particular embodiment, the second phase can include silicon carbide in an amount of at least 0.1 wt %, or at least 0.2 wt %, or at least 0.25 wt %, or at least 0.3 wt %, or at least 0.4 wt %, or at least 0.5 wt %, or at least 0.6 wt %, or at least 0.7 wt %, or at least 0.75 wt %, or at least 0.8 wt %, or at least 0.9 wt %, or at least 2 wt %, or at least 3 wt %, or at least 4 wt %, or at least 5 wt %, or at least 6 wt %, or at least 7 wt %, or at least 8 wt %, or at least 9 wt %, or at least 10 wt %, based on a total weight of the second phase. Further, in a particular embodiment, the second phase can include silicon carbide in an amount of at most 10 wt %, or at most 9 wt %, or at most 8 wt %, or at most 7 wt %, or at most 6 wt %, or at most 5 wt %, or at most 4 wt %, or at most 3 wt %, or at most 2 wt %, or at most 1 wt %, based on a total weight of the second phase. Moreover, the second phase can include silicon carbide in an amount in a range including any of the minimum and maximum percentages noted herein. For instance, silicon carbide can be present in the second phase in an amount including at least 0.1 wt % and at most 10 wt % or in an amount including at least 0.5 wt % and at most 9 wt %.

In a particular embodiment, the silicon carbide grains of the second phase can have an average grain size that can facilitate improved formation and performance of the ceramic composite. For instance, the silicon carbide grains of the second phase can have an average grain size of at least 0.3 microns, such as at least 0.4 microns, or at least 0.5 microns, or at least 0.6 microns, or at least 0.7 microns, or at least 0.8 microns, or at least 0.9 microns, or at least 1 micron, or at least 1.2 microns, or at least 1.4 microns, or at least 1.6 microns, or at least 1.8 microns, or at least 1.9 microns, or at least 2 microns, or at least 2.2 microns, or at least 2.4 microns, or at least 2.6 microns, or at least 2.8 microns, or at least 2.9 microns, or at least 3 microns, or at least 3.2 microns, or at least 3.4 microns, or at least 3.6 microns, or at least 3.8 microns, or at least 3.9 microns, or at least 4 microns, or at least 4.2 microns, or at least 4.4 microns, or at least 4.6 microns, or at least 4.8 microns, or at least 5 microns, or at least 5.2 microns, or at least 5.5 microns, or at least 6 microns, or at least 6.3 microns, or at least 6.5 microns, or at least 7 microns, or at least 7.5 microns, or at least 8 microns, or at least 8.5 microns, or at least 9 microns, or at least 9.5 microns, or at least 9.8 microns, or at least 10 microns, or at least 12 microns, or at least 16 microns, or at least 20 microns, or at least 25 microns, or at least 30 microns, or at least 35 microns. In another instance, the average grain size of silicon carbide in the second phase can be at most 200 microns, at most 190 microns, at most 180 microns, or at most 170 microns, or at most 150 microns, or at most 140 microns, or at most 120 microns, or at most 100 microns, such as at most 95 microns, or at most 90 microns, or at most 85 microns, or at most 80 microns, or at most 75 microns, or at most 70 microns, or at most 65 microns, or at most 60, at most 55 microns, at most 50 microns, or at most 46 microns, or at most 40 microns, or at most 35 microns, or at most 30 microns, or at most 25 microns, or at most 20 microns, or at most 15 microns, or at most 10 microns, or at most 8 microns, or at most 6 microns, at most 5 microns, or at most 4.8 microns, or at most 4.6 microns, or at most 4.4 microns, or at most 4.1 microns, or at most 3.9 microns, or at most 3.7 microns, or at most 3.5 microns, or at most 3.3 microns, or at most 3.1 microns, or at most 2.9 microns, or at most 2.6 microns, or at most 2.4 microns, or at most 2.2 microns, or at most 2 microns, or at most 1.8 microns, or at most 1.5 microns, or at most 1.3 microns, or at most 1 micron, or at most 0.5 microns. Moreover, the grain size of silicon carbide in the second phase can be in a range including any of the minimum and maximum values noted herein. For instance, the average grain size can be in a range of 0.3 to 200 microns, or in a range of 0.8 to 200 microns, or in a range of 5 microns to 200 microns.

Furthermore, in a particular embodiment, the second phase can include elemental carbon in an amount of at most 7 wt %, or at most 6 wt %, or at most 5 wt %, or at most 4.5 wt %, or at most 4 wt %, or at most 3.5 wt %, or at most 3 wt %, or at most 2.5 wt %, or at most 2 wt %, or at most 1.5 wt %, or at most 1 wt %, based on a total weight of the second phase. In another particular embodiment, the second phase can include elemental carbon in an amount of at least 0.05 wt %, such as at least 0.07 wt %, or at least 0.09 wt %, or at least 1 wt %, or at least 1.2 wt %, or at least 1.5 wt %, or at least 2 wt %, or at least 2.2 wt %, or at least 2.5 wt %, or at least 2.8 wt %, or at least 3 wt %, or at least 3.2 wt %, or at least 3.5 wt %, or at least 3.8 wt %, or at least 4 wt %, or at least 4.3 wt %, or at least 4.7 wt %, or at least 5 wt % for a total weight of the second phase. Further, the second phase can include elemental carbon in a range including any of the minimum or maximum percentages noted herein. For instance, the elemental carbon can be present in the second phase in an amount including at least 0.05 wt % and at most 7 wt % for the total weight of the second phase.

In addition, the second phase can include elemental carbon having an average grain size of at least 0.3 microns, such as at least 0.5 microns, or at least 0.7 microns, or at least 0.9 microns, or at least 1 microns, or at least 1.4 microns, or at least 1.8 microns, at least 2 microns, or at least 2.5 microns, such as at least 2.7 microns, at least 2.9 microns, or at least 3.5 microns, or at least 4 microns, or at least 4.5 microns, or at least 5 microns, or at least 7 microns, or at least 8 microns, or at least 9 microns, or at least 10 microns. In another embodiment, the elemental carbon in the second phase can have an average grain size of at most 100 microns, such as at most 90 microns, at most 80 microns, at most 75 microns, at most 70 microns, at most 65 microns, at most 60 microns, at most 50 microns, at most 45 microns, or at most 40 microns, or at most 30 microns, or at most 25 microns, or at most 20 microns, or at most 10 microns. Moreover, the elemental carbon in the second ceramic phase can have an average grain size in a range including any of the minimum and maximum values noted herein. For instance, the second ceramic phase can include elemental carbon having a grain size in range of 0.3 to 100 microns or in a range of 0.5 to 80 microns. In another embodiment, the elemental carbon in the second phase can have similar or different average grain size compared to the elemental carbon in the first phase.

In a further embodiment, the second phase can include silicon carbide and boron carbide. In a particular embodiment, silicon carbide and boron carbide can be present in the second phase in the amount noted with respect to each compound in this disclosure. For example, the second phase can include boron carbide in an amount of about 99.9 wt %, 99.8 wt %, 99.75 wt %, 99.7 wt %, 99.6 wt %, 99.5 wt %, 99.4 wt %, 99.3 wt %, 99.25 wt %, 99.2 wt %, 99.1 wt %, 99 wt %, 98 wt %, 97 wt %, 96 wt %, 95 wt %, 94 wt %, 93 wt %, 92, wt %, 91 wt %, or 90 wt %, and a ranges therebetween, and silicon carbide in an amount of about 0.1 wt %, 0.2 wt %, 0.25 wt %, 0.3 wt %, 0.4 wt %, 0.5 wt %, 0.6 wt %, 0.7 wt %, 0.75 wt %, 0.8 wt %, 0.9 wt %, 1 wt % , 2 wt %, 3 wt %, 4 wt %, 5 wt %, 6 wt %, 7 wt %, 8 wt %, 9 wt % or 10 wt %, or ranges therebetween. Further, the second phase can include silicon carbide and boron carbide in a range of any of the above values as minimum or maximum.

In an embodiment, the ceramic composite can include a ratio of a weight percentage of the first phase to a weight percentage of the second phase that can facilitate improved formation of the ceramic composite. For example, the weight percentage ratio of the first phase to the second phase can be at least 1:99, such as at least 2:98, or at least 5:95, or at least 8:92, or at least 10:90, at least 18:82, or at least 20:80, or at least 22:78, or at least 24:76, or at least 26:74, or at least 28:72, or at least 30:70, or at least 33:67, or at least 35:65, or at least 40:60, or at least 45:55, or at least 50:50, or at least 55:45, or at least 60:40, or at least 62:38, or at least 65:35, or at least 68:32, or at least 70:30, or at least 73:27, or at least 76:24, or at least 79:21, or at least 77:23, or at least 80:20, or at least 85:15, or at least 88:12, or at least 90:10, or at least 92:8. In another embodiment, the ratio of the weight percentage of the first phase to the weight percentage of the second phase can be at most 99:1, such as at most 96:4, or at most 94:6, or at most 93:7, or at most 91:9, or at most 90:10, or at most 82:18, or at most 80:20, or at most 78:22, or at most 76:24, or at most 74:26, or at most 72:28, or at most 70:30, or at most 65:35, or at most 63:37, or at most 60:40, or at most 58:42, or at most 55:45, or at most 50:50, or at most 46:54, or at most 44:56, or at most 40:60, or at most 36:64, or at most 32:68, or at most 30:70, or at most 25:75, or at most 23:77, or at most 20:80, or at most 18:82, or at most 15:85, or at most 12:88, or at most 10:90, or at most 5:95, or at most 1:99. Moreover, the ratio of the weight percentage of the first phase to the weight percentage of the second phase can be in a range including any of the minimum and maximum values disclosed herein, such as in a range of 1:99 to 99:1,or in a range of 5:95 to 95:5, or in a range of 10:90 to 90:10, or in a range of 82:18 to 18:82, or in a range of 80:20 to 20:80, or in a range of 78:22 to 22:78, or in a range of 76:24 to 24:76, or in a range of 74:26 to 26:74, or in a range of 72:28 to 28:72, or in a range of 70:30 to 30:70, or in a range of 65:35 to 35:65, or in a range of 60:40 to 40:60, or in a range of 55:45 to 45:55, or in a range of 50:50, based on a total weight of the ceramic composite.

In an embodiment, as the content of the first and second phase approach each other, such as in a range of 65:35 to 35:65, or in a range of 60:40 to 40:60, or in a range of 55:45 to 45:55, or in a range of 50:50, based on a total weight of the ceramic composite, the 3-3 connectivity appears. In another embodiment, as the content of the first and second phase move away from each other, such as in a range of 1:99 to 99:1, or in a range of 90:10 to 10:90, or in a range of 82:18 to 18:82, or in a range of 80:20 to 20:80, or in a range of 78:22 to 22:78, or in a range of 76:24 to 24:76, or in a range of 74:26 to 26:74, or in a range of 72:28 to 28:72, or in a range of 70:30 to 30:70, the 1-3 connectivity appears. In a further embodiment, the ceramic composite can include the 3-3 connectivity, the 1-3 connectivity, or both.

In another embodiment, the ceramic composite can include a ratio of the total amount of silicon carbide in the ceramic composite to the total amount of boron carbide in the ceramic composite that can facilitate improved formation and performance. For example, the ratio of the total amount of silicon carbide to the total amount of boron carbide can be at least 1:99, such as at least 3:97, or at least 5:95, or at least 8:92, or at least 10:90, at least 15:85, or at least 18:82, or at least 20:80, or at least 22:38, or at least 24:76, or at least 26:74, or at least 28:72, or at least 30:70, or at least 35:65, or at least 40:60, or at least 45:55, or at least 50:50, or at least 60:40, or at least 65:35, or at least 70:30, or at least 75:25, or at least 80:20, or at least 85:15, or at least 90:10, or at least 92:8, or at least 95:5. In yet another embodiment, the ratio of the total amount of silicon carbide to the total amount of boron carbide can be at most 99:1, such as at most 95:5, or at most 92:8, or at most 90:10, or at most 86:4, or at most 82:18, or at most 80:20, or at most 78:22, or at most 76:24, or at most 74:26, or at most 72:28, or at most 70:30, or at most 65:35, or at most 60:40, or at most 55:45, or at most 50:50, or at most 45:55, or at most 40:60, or at most 35:65, or at most 30:70, or at most 25:75, or at most 20:80, or at most 15:85, or at most 10:90, or at most 8:92, or at most 5:95. Moreover, the ratio of the total amount of silicon carbide to the total amount of boron carbide can be in a range including any of the minimum and maximum values disclosed herein, such as in a range of 1:99 to 99:1, or in a range of 5:95 to 95:5, or in a range of 10:90 to 90:10, or in a range of 82:18 to 18:82, or in a range of 80:20 to 20:80, or in a range of 78:22 to 22:78, or in a range of 76:24 to 24:76, or in a range of 74:26 to 26:74, or in a range of 72:28 to 28:72, or in a range of 70:30 to 30:70, or in a range of 65:35 to 35:65, or in a range of 60:40 to 40:60, or in a range of 55:45 to 45:55, or in a range of 50:50.

In an embodiment, the ceramic composite can include a third phase. The third phase can include elemental carbon. In a particular embodiment, the third phase can consist essentially of elemental carbon. In another particular embodiment, the third phase can have a minimum width in a range of 0.5 to 100 microns.

Further, a weight percentage of boron carbide in the first phase, based on a total weight of the first phase, is less than a weight percentage of boron carbide in the second phase, based on a total weight of the second phase. Similarly, a weight percentage of silicon carbide in the second phase, based on a total weight of the second phase, is less than a weight percentage of silicon carbide in the first phase, based on a total weight of the first phase.

In certain embodiments, the method for making the ceramic composite can include providing dry ceramic powders, dry mixing the ceramic powders, and sintering the formed mixed powders.

Conventionally, the precursor to a silicon carbide or boron carbide ceramic material includes silicon carbide and boron carbide particulates in a dispersion and wet mixed. The wet mixing is done at such high energy, that the particulates are grinded to fine particulates having sizes well below those described above, such as a median granule size of no greater than 30, or 20, or 10 microns. However, in embodiments described herein, the method can include dry mixing the powder. In particular embodiments, the dry mixing can occur within a V-cone blender or a double cone blender, and can be accomplished through tumbling of the powders within a rotating drum-type container.

The mixed powders can then be formed and sintered to achieve the ceramic composite described herein. In certain embodiments, as discussed above with respect the granulate size of the powders, the sintering can include pressureless sintering. As used herein, the term "pressureless" refers to ambient pressure without applying any additional pressure.

In certain embodiments, the sintering can include sintering at a temperature of at least 1900° C., or at least 2000° C., or at least 2100° C. In further embodiments, the pressureless sintering can include sintering at a temperature of no greater than 4000° C., or at least 3500° C., or at least 3000° C. Moreover, the pressureless sintering can include sintering at a temperature in a range of any of the above minimum and maximum values, such as in a range of 1900 to 4000° C., or 2000 to 3500° C., or 2100 to 3000° C.

A particular advantage of certain embodiments of the ceramic composite having the multi-phasic microstructure described herein is that at least one of the first ceramic phase and the second ceramic phase can have an average hardness of at least 1500 GPa, or at least 1600 GPa, or at least 1700 GPa, as measured according to a Knoop Hardness Test under a 1 kg load. In further embodiments, at least one of the first ceramic phase and the second ceramic phase can have an average hardness of at most 2500 GPa, or at most 2400 GPa, or at most 2300 GPa, as measured according to a Knoop Hardness Test under a 1 kg load. Moreover, at least one of the first ceramic phase and the second ceramic phase can have an average hardness including any of the minimum and maximum values noted herein, as measured according to a Knoop Hardness Test under a 1 kg load. For example, at least one of the first ceramic phase and the second ceramic phase can have an average hardness in a range of at least 1500 GPa and at most 2500 GPa.

Another particular advantage of certain embodiments of the ceramic composite having the multi-phasic microstructure described herein is that the ceramic composite can have an average modulus of elasticity of at least 360 GPa, or at least 370 GPa, or at least 380 GPa, as measured according to ASTM C674-13. In further embodiments, the ceramic composite can have an average modulus of elasticity of at most 500 GPa, or at most 490 GPa, or at most 480 GPa, as measured according to ASTM C674-13. Moreover, the ceramic composite can have an average modulus of elasticity including any of the minimum and maximum values noted herein, as measured according to ASTM C674-13. For example, the ceramic composite can have an average modulus of elasticity in a range of at least 360 GPa and at most 500 GPa.

A particular advantage of certain embodiments of the ceramic composite having the multi-phasic microstructure described herein is that the ceramic composite can have an average bulk density of at most 3.1 g/cm$^3$, or at most 3.05 g/cm$^3$, or at most 3 g/cm$^3$. Further, the ceramic composite can have an average bulk density of at least 2.4 g/cm$^3$, or at least 2.5 g/cm$^3$, or at least 2.6 g/cm$^3$. Moreover, the ceramic composite can have an average bulk density in a range including any of the minimum and maximum values noted herein, such as in a range of at least 2.4 g/cm$^3$ and at most 3.1 g/cm$^3$. Bulk density can be measured by the Archimedes method weight/(weight-suspended weight) and reported in grams/cm$^3$.

In an embodiment, the composite can have a density of at least 95.5% of the theoretical density, such as at least 96.5%, at least 97%, or at least 97.5%, or of at least 98%, or at least 98.5, or at least 99%, or at least 99.5%, or at least 99.9% of the theoretical density.

A particular advantage of certain embodiments of the ceramic composite having the multi-phase microstructure described herein is that the ceramic composite can have an average porosity of at most 5%, or at most 4%, or at most 3%. Although it may be desired to have a ceramic composite of 0% porosity, in many cases the ceramic composite may have an average porosity of at least 0.001%, or at least 0.01%, or at least 0.1%. In a further embodiment, the ceramic composite can have an average porosity in a range including any of the minimum and maximum percentages disclosed herein, such as in a range of at least 0.001% and at most 3%. Average porosity is measured by image analysis in 30 fields at >13000 µ$^2$ each or >390,000 µ$^2$ total.

In a further embodiment, the ceramic composite can have reduced weight compared to a corresponding conventional ceramic product. The corresponding conventional ceramic product can have the same shape and dimension of the ceramic composite, but is formed with a conventional ceramic material, such as SiC. For instance, the ceramic composite can have a weight reduction of at least 4% compared to the weight of the corresponding conventional ceramic product, such as at least 5%, at least 6%, at least 7%, at least 8%, at least 9%, at least 10%, at least 11%, at least 12%, at least 13%, at least 14%, at least 15%, at least 16%, or at least 17%. In another instance, the weight reduction can be at most 25% compared to the weight of the corresponding conventional ceramic product, such as at most 23%, at most 22%, at most 20%, at most 19%, at most 18%, at most 17%, at most 16%, at most 15%, at most 14%, at most 13%, at most 12%, at most 11%, at most 10%, at most 9%, at most 8%, at most 7%, or at most 6%. Moreover, the weight reduction can be within a range including any of the minimum and maximum percentages noted herein. The weight reduction of the ceramic composite can be determined by the formula $\Delta W=(Wcon-Wcom)\times 100\%$, wherein $\Delta W$ represents the weight reduction, Wcon is the weight of the corresponding conventional ceramic product, and Wcom is the weight of the ceramic composite.

The ceramic composite described herein can be useful as a ceramic tile. For example, an armor subcomponent can include a ceramic tile including the ceramic composite described herein. The armor subcomponent can include a ballistic armor insert.

Figure 4:
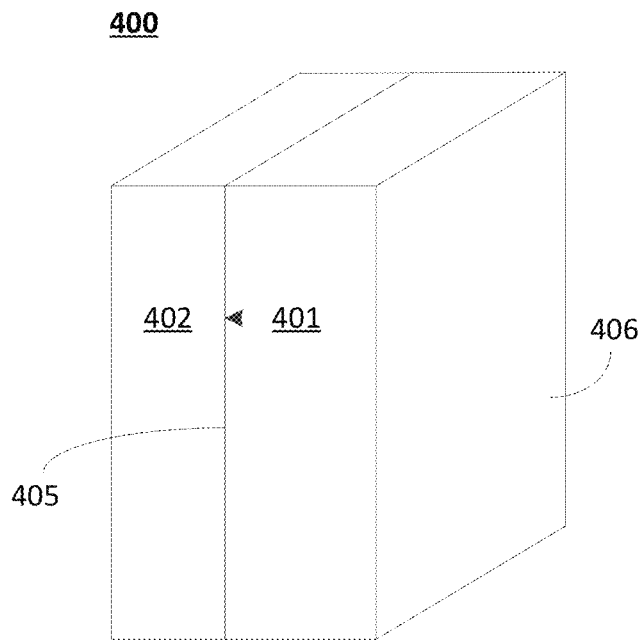
FIG. 4 includes a perspective illustration of a portion of an armor component in accordance with an embodiment.
Figure 5:
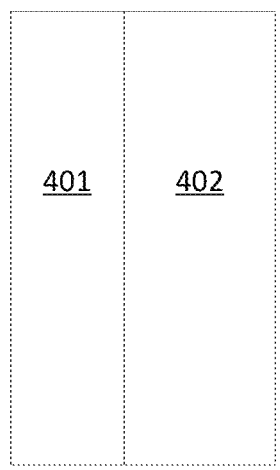
FIG. 5 includes a cross-sectional illustration of a portion of an armor component in accordance with an embodiment.
Figure 6:
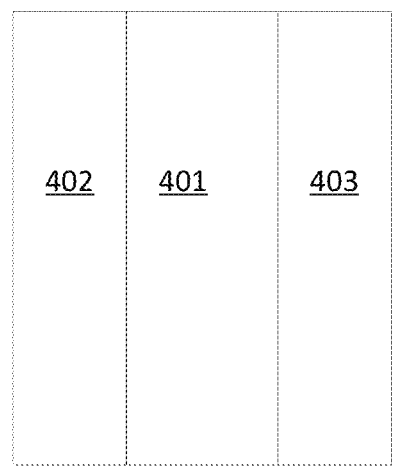
FIG. 6 includes a cross-sectional illustration of a portion of an armor component in accordance with an embodiment.

In accordance with an embodiment, an armor component can include a ceramic body including the ceramic composite and a first component adjacent the ceramic body. FIG. 4 includes a perspective view illustration of an armor component 400 in accordance with an embodiment. As illustrated, the armor component 400 includes a ceramic body 401 and a first component 402. In particular instances, the first component 402 may overlie the ceramic body 401. In other embodiments, it will be appreciated that the first component 402 may have a particular position relative to the ceramic body 401. For example, as illustrated in FIG. 5, the first component 402 may underlie the ceramic body 401. As further illustrated in FIG. 6, another construction of the armor component 400 can include the ceramic body 401 disposed between the first component 402 and a third component 403. It will be appreciated that various suitable arrangements of the ceramic body 401 relative to other components (e.g., the first component 402 and the second component 403) are contemplated and within the scope of the embodiments described herein. Referring to FIG. 4, in accordance with an embodiment, the first component 402 can be abutting at least a portion of the ceramic body 401, and more particularly, may be in direct contact with a first major surface 405 of the ceramic body 401. More particularly, the first component 402 and ceramic body 401 may be bonded to each other at the first major surface 405 of the ceramic body 401. The opposite surface 406 may be a strikeface of the ceramic body 401.

In accordance with an embodiment, the first component 401 may include a particular material, including but not limited to a ceramic, such as a boride, a nitride, an oxide, a carbide, and any combination thereof. In particular, the first component 102 may include alumina ($Al_2O_3$), boron carbide ($B_4C$), silicon carbide (SiC), calcium hexaboride ($CaB_6$), aluminum dodecaboride ($AlB_{12}$), boron suboxide ($B_6O$), silicon nitride ($Si_3N_4$), aluminum nitride (AlN), and any combination thereof. In still another alternative embodiment, the first component may include a material, such as an organic material component, and more particularly a polymer, such as a polyethylene, polyurethane, a fluorinated polymer, a resin, a thermoset, a thermoplastic, a para-aramid fiber, and any combination thereof.

Further, it will be appreciated that the first component 401 may include a composite material, which may include a combination of materials, including for example natural materials, synthetic materials, organic materials, inorganic materials, and any combination thereof. Some suitable inorganic materials can include ceramics, metals, glasses, and the like.

In one particular embodiment, the first component 401 may include a boride material. In particular instances, the boride material may include one metal element, including, for example, but not limited to, a transition metal element. In certain instances, the metal element may include zirconium (Zr), titanium (Ti), aluminum (Al), and a combination thereof. For example, the first component 102 may include calcium hexaboride (CaB$_6$), aluminum dodecaboride (AlB$_{12}$), magnesium aluminum diboride (MgAlB$_2$). In one particular instance, the first component may include zirconium boride (ZrB$_2$). In still another embodiment, the first component may include titanium boride (TiB$_2$).

In an alternative embodiment, the first component 401 may include a composition, such as a first composition that is different than the composition of the ceramic body. For example, the first component may include a first composition including a nitride material that is different than a nitride material contained within the ceramic body. The nitride material of the first component may include a metal element, in particular a transition metal element. In particular instances, the first component may include silica nitride (Si$_3$N$_4$), titanium nitride (TiN), aluminum nitride (AlN), and a combination thereof.

In accordance with another embodiment, the first component may include a ceramic material, including an oxide material. In certain instances, the oxide material may include aluminum oxide (Al$_2$O$_3$), boron suboxide (B$_6$O), and a combination thereof. In other instances, the oxide material may include at least one element, including, but not limited to, a transition metal element. For example, some suitable metal elements can include yttrium (Y), lanthanum (La), and a combination thereof. In one particular instance, the first component can include an oxide material including yttria (Y$_2$O$_3$). In another embodiment, the first component can include an oxide material comprising lanthanum oxide (La$_2$O$_3$).

In still another embodiment, the first component may include a ceramic material, such as a carbide material. Suitable carbide materials may include at least one metal element, including, for example, but not limited to, a transition metal element. Some suitable transitional metal elements can include, for example, titanium (Ti), aluminum (Al), boron (B), and a combination thereof. For example, the first component may include a ceramic material comprising titanium carbide (TiC). In another embodiment, the first component can include a carbide material including aluminum carbide (Al$_4$C$_3$). In another embodiment, the first component may include silicon carbide (SiC). In yet another embodiment, the first component may include a carbide material including boron carbide (B$_4$C).

In still other instances, the first component may include some natural materials, for example a woven material. In other instances, the first component may include a non-woven material. Some suitable examples of woven and non-woven material can include those utilizing a fiber, and more particularly, may include a ballistic fiber. In accordance with an embodiment, the ballistic fiber may include a natural material, synthetic material, and a combination thereof. According to one particular design, the first component may include a ballistic fiber that includes nylon.

In another aspect, the armor component may include a second component that is distinct from the first component and ceramic body. In certain instances, one or more of the ceramic body, the first component, or the second component may be in the form of a layer. As such, the second component can have dimensions substantially similar to the ceramic body and first component as described in embodiments herein. As further illustrated, the second component may be adjacent to the ceramic component. More particularly, the second component may be overlying the ceramic body. For example, the second component can be underlying the ceramic body, and more particularly, may be abutting the ceramic body. It will be appreciated that the second component can have any of the attributes of the first component and the ceramic body described in the embodiments herein.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1. A ceramic composite comprising:
a first ceramic phase comprising a first ceramic material; and
a second ceramic phase comprising a second ceramic material;
wherein the first ceramic material has a different composition than the second ceramic material;
wherein at least one of the first ceramic phase and the second ceramic phase has a median minimum width of at least 5 microns.

Embodiment 2. A ceramic composite comprising:
a first ceramic phase comprising a first ceramic material; and
a second ceramic phase comprising a second ceramic material different than the first ceramic material;
wherein the ceramic composite has a modulus of elasticity of at least 350 GPa, as measured according to ASTM C674-13, and each of the first and second phases has a hardness of at least 1700 kg/mm$^2$, as measured according to the Knoop hardness test under a 1 kg load.

Embodiment 3. A ceramic composite comprising:
a first ceramic material present in an amount of 35 wt % to 65 wt %, based on the total weight of the ceramic composite; and
a second ceramic material present in an amount of 35 wt % to 65 wt %, based on the total weight of the ceramic composite;
wherein the first ceramic material has a different composition than the second ceramic material; and
wherein the ceramic composite comprises a first phase comprising a majority of the first ceramic material and a second phase comprising a majority of the second ceramic material, the first and second phase having a 3-3 connectivity pattern.

Embodiment 4. A ceramic composite comprising:
a first ceramic material and a second ceramic material present in a ratio of a weight percentage of the first ceramic material to a weight percentage of the second ceramic material in a range of 82:18 to 65:35 or 18:82 to 35:65;
wherein the first ceramic material has a different composition than the second ceramic material; and
wherein the ceramic composite comprises a first phase comprising a majority of the first ceramic material and a second phase comprising a majority of the second ceramic material, the first and second phase having a 1-3 connectivity pattern.

Embodiment 5. A ceramic composite comprising:
a first phase comprising a silicon carbide having a grain size in a range of 0.3 to 200 microns, or in a range of 5 to 200 microns and a carbon having a grain size in a range of 0.5 to 100 microns; and
a second phase comprising a boron carbide, a silicon carbide having a grain size in a range of 0.3 to 200 microns, and a carbon having a grain size in range of 0.5 to 100 microns;
wherein the silicon carbide of the first phase is separated from the silicon carbide of the second phase.

Embodiment 6. The ceramic composite of any one of embodiments 1 to 3, wherein the first phase comprises a silicon carbide.

Embodiment 7. The ceramic composite of any one of the preceding embodiments, wherein the silicon carbide of the first phase includes α-SiC, 15R-SiC, 3C-SiC, or any combination thereof.

Embodiment 8. The ceramic composite of any one of embodiments 1 to 3, 5, and 6, wherein the second phase comprises a boron carbide.

Embodiment 9. The ceramic composite of any one of the preceding embodiments, wherein the second phase further comprises a silicon carbide including β-SiC.

Embodiment 10. The ceramic composite of any one of the preceding embodiments, wherein at least one of the first ceramic phase and the second ceramic phase has an average hardness of at least 1500 GPa, or at least 1600 GPa, or at least 1700 GPa, as measured according to a Knoop Hardness Test under a 1 kg load.

Embodiment 11. The ceramic composite of any one of the preceding embodiments, wherein at least one of the first ceramic phase and the second ceramic phase has an average hardness of at most 2500 GPa, or at most 2400 GPa, or at most 2300 GPa, as measured according to a Knoop Hardness Test under a 1 kg load.

Embodiment 12. The ceramic composite of any one of the preceding embodiments, wherein the ceramic composite has an average modulus of elasticity of at least 360, GPa, or at least 370 GPa, or at least 380 GPa, as measured according to ASTM C674-13.

Embodiment 13. The ceramic composite of any one of the preceding embodiments, wherein the ceramic composite has an average modulus of elasticity of at most 500 GPa, or at most 490 GPa, or at most 480 GPa, as measured according to ASTM C674-13.

Embodiment 14. The ceramic composite of any one of the preceding embodiments, wherein the ceramic composite has an average bulk density of at most 3.1 g/cm$^3$, or at most 3.05 g/cm$^3$, or at most 3 g/cm$^3$.

Embodiment 15. The ceramic composite of any one of the preceding embodiments, wherein the ceramic composite has an average bulk density of at least 2.4 g/cm$^3$, or at least 2.5 g/cm$^3$, or at least 2.6 g/cm$^3$.

Embodiment 16. The ceramic composite of any one of the preceding embodiments, wherein the ceramic composite has an average porosity of at most 5%, or at most 4%, or at most 3%.

Embodiment 17. The ceramic composite of any one of the preceding embodiments, wherein the ceramic composite has an average porosity of at least 0.001%, or at least 0.01%, or at least 0.1%.

Embodiment 18. The ceramic composite of any one of the preceding embodiments, wherein the first phase is present in an amount of at least 1 wt %, or at least 2 wt %, or at least 4 wt %, or at least 5 wt %, or at least 6 wt %, or at least 7 wt %, or at least 8 wt %, or at least 9 wt %, at least 10 wt %, or at least 12 wt %, or at least 15 wt %, or at least 18 wt %, or at least 20 wt %, or at least 22 wt %, or at least 24 wt %, or at least 26 wt %, or at least 28 wt %, or at least 30 wt %, or at least 32 wt % or at least 34 wt %, or at least 36 wt %, or at least 38 wt %, or at least 40 wt %, or at least 42 wt %, or at least 44 wt %, or at least 46 wt %, or at least 48 wt %, or at least 50 wt %, or at least 52 wt %, or at least 55 wt %, or at least 58 wt %, or at least 60 wt %, or at least 62 wt %, or at least 64 wt %, or at least 66 wt %, or at least 68 wt %, or at least 70 wt %, or at least 72 wt %, or at least 75 wt %, or at least 78 wt %, or at least 80 wt %, or at least 82 wt %, or at least 84 wt %, or at least 86 wt %, or at least 88 wt %, or at least 90 wt %, or at least 92 wt %, or at least 94 wt %, or at least 95 wt %, or at least 97 wt %, or at least 98 wt %, or at least 99 wt %, based on a total weight of the ceramic composite.

Embodiment 19. The ceramic composite of any one of the preceding embodiments, wherein the first phase is present in an amount of at most 99 wt %, at most 98 wt %, or at most 97 wt %, or at most 95 wt %, or at most 92 wt %, at most 90 wt %, or at most 88 wt %, or at most 85 wt %, or at most 82 wt %, or at most 80 wt %, or at most 78 wt %, or at most 76 wt %, or at most 74 wt %, or at most 72 wt %, or at most 70 wt %, or at most 68 wt %, or at most 66 wt %, or at most 64 wt %, or at most 62 wt %, or at most 60 wt %, or at most 58 wt %, or at most 56 wt %, or at most 54 wt %, or at most 52 wt %, or at most 50 wt %, or at most 48 wt %, or at most 46 wt %, or at most 44 wt %, or at most 42 wt %, or at most 40 wt %, or at most 38 wt %, or at most 36 wt %, or at most 34 wt %, or at most 32 wt %, or at most 30 wt %, or at most 28 wt %, or at most 26 wt %, or at most 24 wt %, or at most 22 wt %, or at most 20 wt %, or at most 18 wt %, or at most 16 wt %, or at most 14 wt %, or at most 12 wt %, or at most 10 wt %, or at most 8 wt %, or at most 6 wt %, or at most 4 wt %, or at most 2 wt %, or at most 1 wt %, based on a total weight of the ceramic composite.

Embodiment 20. The ceramic composite of any one of the preceding embodiments, wherein the second phase is present in an amount of at least 1 wt %, or at least 1.3 wt %, or at least 2 wt %, or at least 2.5 wt %, or at least 3 wt %, or at least 4 wt %, or at least 5 wt %, or at least 6 wt %, or at least 7 wt %, or at least 8 wt %, or at least 9 wt %, or at least 10 wt %, or at least 11 wt %, or at least 13 wt %, or at least 15 wt %, or at least 17wt %, or at least 18 wt %, or at least 20 wt %, or at least 22 wt %, or at least 24 wt %, or at least 26 wt %, or at least 28 wt %, or at least 30 wt %, or at least 32 wt % or at least 34 wt %, or at least 36 wt %, or at least 38 wt %, or at least 40 wt %, or at least 42 wt %, or at least 44 wt %, or at least 46 wt %, or at least 48 wt %, or at least 50 wt %, or at least 52 wt %, or at least 55 wt %, or at least 58 wt %, or at least 60 wt %, or at least 62 wt %, or at least 64 wt %, or at least 66 wt %, or at least 68 wt %, or at least 70 wt %, or at least 72 wt %, or at least 75 wt %, or at least 78 wt %, or at least 80 wt %, or at least 82 wt %, or at least 84 wt %, or at least 86 wt %, or at least 88 wt %, or at least 90 wt %, or at least 92 wt %, or at least 93 wt %, or at least 94 wt %, or at least 96 wt %, or at least 99 wt %, based on a total weight of the ceramic composite.

Embodiment 21. The ceramic composite of any one of the preceding embodiments, wherein the second phase is present in an amount of at most 99 wt %, at most 98 wt %, or at most 97 wt %, or at most 95 wt %, or at most 92 wt %, or at most 90 wt %, or at most 88 wt %, or at most 85 wt %, or at most 82 wt %, or at most 80 wt %, or at most 78 wt %, or at most 76 wt %, or at most 74 wt %, or at most 72 wt %, or at most 70 wt %, or at most 68 wt %, or at most 66 wt %, or at most 64 wt %, or at most 62 wt %, or at most 60 wt %, or at most 58 wt %, or at most 56 wt %, or at most 54 wt %, or at most 52 wt %, or at most 50 wt %, or at most 52 wt %, or at most 50 wt %, or at most 48 wt %, or at most 46 wt %, or at most 44 wt %, or at most 42 wt %, or at most 40 wt %, or at most 38 wt %, or at most 36 wt %, or at most 34 wt %, or at most 32 wt %, or at most 30 wt %, or at most 28 wt %, or at most 26 wt %, or at most 24 wt %, or at most 22 wt %, or at most 20 wt %, or at most 18 wt %, or at most 16 wt %, or at most 14 wt %, or at most 12 wt %, or at most 10 wt %, or at most 8 wt %, or at most 6 wt %, or at most 4 wt %, or at most 3 wt %, or at most 2 wt %, or at most 1 wt %, based on a total weight of the ceramic composite.

Embodiment 22. The ceramic composite of any one of the preceding embodiments, wherein a ratio of a weight percentage of the first phase to a weight percentage of the second phase is in a range of 1:99 to 99:1,or in a range of 5:95 to 95:5, or in a range of 10:90 to 90:10, or in a range of 82:18 to 18:82, or in a range of 80:20 to 20:80, or in a range of 78:22 to 22:78, or in a range of 76:24 to 24:76, or in a range of 74:26 to 26:74, or in a range of 72:28 to 28:72, or in a range of 70:30 to 30:70, or in a range of 65:35 to 35:65, 60:40 to 40:60, or in a range of 55:45 to 45:55, or in a range of 50:50, based on a total weight of the ceramic composite.

Embodiment 23. The ceramic composite of any one of the preceding embodiments, wherein a weight percentage of silicon carbide in the first phase, based on a total weight of the first phase, is greater than a weight percentage of silicon carbide in the second phase, based on a total weight of the second phase.

Embodiment 24. The ceramic composite of any one of the preceding embodiments, wherein the first phase includes silicon carbide in an amount of at least 50 wt %, or at least 52 wt %, or at least 55 wt %, or at least 58 wt %, or at least 60 wt %, or at least 62 wt %, or at least 64 wt %, or at least 66 wt %, or at least 68 wt %, or at least 70 wt %, or at least 72 wt %, or at least 75 wt %, or at least 78 wt %, or at least 80 wt %, or at least 82 wt %, or at least 84 wt %, or at least 86 wt %, or at least 88 wt %, or at least 90 wt %, or at least 91 wt %, or at least 92 wt %, or at least 93 wt %, or at least 94 wt %, or at least 95 wt %, or at least 96 wt %, or at least 97 wt %, or at least 98 wt %, or at least 99 wt %, or at least 99.1 wt %, or at least 99.2 wt %, or at least 99.25 wt %, or at least 99.3 wt %, or at least 99.4 wt %, or at least 99.5 wt %, or at least 99.6 wt %, or at least 99.7 wt %, or at least 99.75 wt %, or at least 99.8 wt %, or at least 99.9 wt %, based on a total weight of the first phase.

Embodiment 25. The ceramic composite of any one of the preceding embodiments, wherein the first phase includes silicon carbide in an amount of at most 99.9 wt %, or at most 99.8 wt %, or at most 99.75 wt %, or at most 99.7 wt %, or at most 99.6 wt %, or at most 99.5 wt %, or at most 99.4 wt %, or at most 99.3 wt %, or at most 99.25 wt %, or at most 99.2 wt %, or at most 99.1 wt %, or at most 99 wt %, or at most 98 wt %, or at most 97 wt %, or at most 96 wt %, or at most 95 wt %, or at most 94 wt %, or at most 93 wt %, or at most 92 wt %, or at most 91 wt %, or at most 90 wt %, based on a total weight of the first phase.

Embodiment 26. The ceramic composite of any one of the preceding embodiments, wherein the second phase includes boron carbide in an amount of at least 50 wt %, or at least 52 wt %, or at least 55 wt %, or at least 58 wt %, or at least 60 wt %, or at least 62 wt %, or at least 64 wt %, or at least 66 wt %, or at least 68 wt %, or at least 70 wt %, or at least 72 wt %, or at least 75 wt %, or at least 78 wt %, or at least 80 wt %, or at least 82 wt %, or at least 84 wt %, or at least 86 wt %, or at least 88 wt %, or at least 90 wt %, or at least 91 wt %, or at least 92 wt %, or at least 93 wt %, or at least 94 wt %, or at least 95 wt %, or at least 96 wt %, or at least 97 wt %, or at least 98 wt %, or at least 99 wt %, %, or at least 99.1 wt %, or at least 99.2 wt %, or at least 99.25 wt %, or at least 99.3 wt %, or at least 99.4 wt %, or at least 99.5 wt %, or at least 99.6 wt %, or at least 99.7 wt %, or at least 99.75 wt %, or at least 99.8 wt %, or at least 99.9 wt %, based on a total weight of the second phase.

Embodiment 27. The ceramic composite of any one of the preceding embodiments, wherein the second phase includes boron carbide in an amount of at most 99.9 wt %, or at most 99.8 wt %, or at most 99.75 wt %, or at most 99.7 wt %, or at most 99.6 wt %, or at most 99.5 wt %, or at most 99.4 wt %, or at most 99.3 wt %, or at most 99.25 wt %, or at most 99.2 wt %, or at most 99.1 wt %, or at most 99 wt %, or at most 98 wt %, or at most 97 wt %, or at most 96 wt %, or at most 95 wt %, or at most 94 wt %, or at most 93 wt %, or at most 92 wt %, or at most 91 wt %, or at most 90 wt %, based on a total weight of the second phase.

Embodiment 28. The ceramic composite of any one of the preceding embodiments, wherein a weight percentage of boron carbide in the first phase, based on a total weight of the first phase, is less than a weight percentage of boron carbide in the second phase, based on a total weight of the second phase.

Embodiment 29. The ceramic composite of any one of the preceding embodiments, wherein the first phase includes boron carbide in an amount of at most 10 wt %, such as at most 9.8 wt %, or at most 9.5 wt %, or at most 9.2 wt %, or at most 9 wt %, or at most 8.8 wt %, or at most 8.5 wt %, or at most 8.2 wt %, or at most 8 wt %, or at most 7.8 wt %, or at most 7.5 wt %, or at most 7.3 wt %, or at most 7.2 wt %, or at most 7 wt %, at most 6.8 wt %, or at most 6.5 wt %, or at most 6.3 wt %, or at most 6 wt %, or at most 5.8 wt %, or at most 5.5 wt %, or at most 5.2 wt %, or at most 3.8 wt %, or at most 3.5 wt %, or at most 3.2 wt %, or at most 3 wt %, or at most 2.8 wt %, or at most 2.5 wt %, or at most 2.2 wt %, or at most 2 wt %, or at most 1.8 wt %, or at most 1.5 wt %, or at most 1.2 wt %, or at most 1 wt %, or at most 0.9 wt %, or at most 0.8 wt %, or at most 0.7 wt %, or at most 0.6 wt %, or at most 0.5 wt %, or at most 0.4 wt %, or at most 0.3 wt %, or at most 0.25 wt %, or at most 0.2 wt %, or at most 0.1 wt %, based on a total weight of the first phase.

Embodiment 30. The ceramic composite of any one of the preceding embodiments, wherein the first phase includes boron carbide in an amount of at least 0.1 wt %, or at least 0.2 wt %, or at least 0.3 wt %, or at least 0.4 wt %, or at least 0.5 wt %, or at least 0.6 wt %, or at least 0.7 wt %, or at least 0.75 wt %. or at least 0.8 wt %, or at least 0.9 wt %, or at least 1 wt %, or at least 1.2 wt %, or at least 1.4 wt %, or at least 1.5 wt %, or at least 1.7 wt %, or at least 1.9 wt %, or at least 2 wt %, or at least 2.2 wt %, or at least 2.4 wt %, or at least 2.5 wt %, or at least 2.7 wt %, or at least 2.9 wt %, or at least 3 wt %, or at least 3.2 wt %, or at least 3.4 wt %, or at least 3.5 wt %, or at least 3.7 wt %, or at least 3.9 wt %, or at least 4 wt %, or at least 4.2 wt %, or at least 4.4 wt %, or at least 4.5 wt %, or at least 4.7 wt %, or at least 4.9 wt %, or at least 5 wt %, or at least 5.2 wt %, or at least 5.5 wt %, or at least 5.7 wt %, or at least 5.9 wt %, or at least 6 wt %, or at least 6.4 wt %, or at least 6.7 wt %, or at least 7 wt %, or at least 7.2 wt %, or at least 7.5 wt %, or at least 7.7 wt %, or at least 8 wt %, or at least 8.4 wt %, or at least 8.7 wt %, or at least 9 wt %, or at least 9.2 wt %, or at least 9.4 wt %, or at least 9.7 wt %, or at least 10 wt %, based on a total weight of the first phase.

Embodiment 31. The ceramic composite of any one of the preceding embodiments, wherein the second phase includes silicon carbide in an amount of at least 0.1 wt %, or at least 0.2 wt %, or at least 0.25 wt %, or at least 0.3 wt %, or at least 0.4 wt %, or at least 0.5 wt %, or at least 0.6 wt %, or at least 0.7 wt %, or at least 0.75 wt %, or at least 0.8 wt %, or at least 0.9 wt %, or at least 2 wt %, or at least 3 wt %, or at least 4 wt %, or at least 5 wt %, or at least 6 wt %, or at least 7 wt %, or at least 8 wt %, or at least 9 wt %, or at least 10 wt %, based on a total weight of the second phase.

Embodiment 32. The ceramic composite of any one of the preceding embodiments, wherein the second phase includes silicon carbide in an amount of at most 10 wt %, or at most 9 wt %, or at most 8 wt %, or at most 7 wt %, or at most 6 wt %, or at most 5 wt %, or at most 4 wt %, or at most 3 wt %, or at most 2 wt %, or at most 1 wt %, based on a total weight of the second phase.

Embodiment 33. The ceramic composite of any one of the preceding embodiments, wherein the first phase, second phase, or both, includes elemental carbon in an amount of at most 7 wt %, or at most 6 wt %, or at most 5 wt %, or at most 4.5 wt %, or at most 4 wt %, or at most 3.5 wt %, or at most 3 wt %, or at most 2.5 wt %, or at most 2 wt %, or at most 1.5 wt %, or at most 1 wt %, based on a total weight of the respective phase or phases.

Embodiment 34. The ceramic composite of any one of the preceding embodiments, wherein the first phase, second phase, or both, has a minimum width in a range of 1 to 200 micron.

Embodiment 35. The ceramic composite of any one of the preceding embodiments, wherein the carbon phase having a minimum width in a range of 0.5 to 100 microns.

Embodiment 36. The ceramic composite of any one of the preceding embodiments, wherein the first phase includes silicon carbide grains having a grain size in a range of 1 to 150 microns.

Embodiment 37. The ceramic composite of any one of the preceding embodiments, wherein the first phase includes boron carbide grains having a grain size in a range of 5 to 200 microns.

Embodiment 38. The ceramic composite of any one of the preceding embodiments, wherein the second phase include boron carbide grains and silicon carbide grains, each having a grain size in a range of 5 to 200 microns.

Embodiment 39. The ceramic composite of any one of the preceding embodiments, wherein the first phase, second phase, or both, includes elemental carbon grains having a grain size in a range of 0.5 to 100 microns.

Embodiment 40. A method of making the ceramic composite of any one of the preceding embodiments comprising dry blending a first phase precursor powder and a second phase precursor powder and sintering the mixture of precursor powders.

Embodiment 41. The method of embodiment 39, wherein sintering the mixture includes pressureless sintering.

Embodiment 42. The method of embodiment 40, wherein the pressureless sintering includes sintering at a temperature of at least 1900° C., or at least 2000° C., or at least 2100° C.

Embodiment 43. A ceramic body comprising the ceramic composite of any one of embodiments 1 to 39.

Embodiment 44. An armor subcomponent comprising the ceramic tile of embodiment 39.

Embodiment 45. An armor component comprising a ceramic body and a first component adjacent the ceramic body, the ceramic body comprising the ceramic composite of any one of embodiments 1 to 39.

EXAMPLE

Example 1

Representative ceramic composite plates, S1 to S9, were formed in accordance with embodiments herein. Silicon carbide and boron carbide were dry mixed at the weight percent ratios included in Table 1. Corresponding conventional plates, C1, were formed with silicon carbide.

TABLE 1

| | SiC:B$_4$C |
|---|---|
| S1 | 80:20 |
| S2 | 70:30 |
| S3 | 65:35 |
| S4 | 60:40 |
| S5 | 50:50 |
| S6 | 40:60 |
| S7 | 35:65 |
| S8 | 30:70 |
| S9 | 20:80 |

Figure 7A:
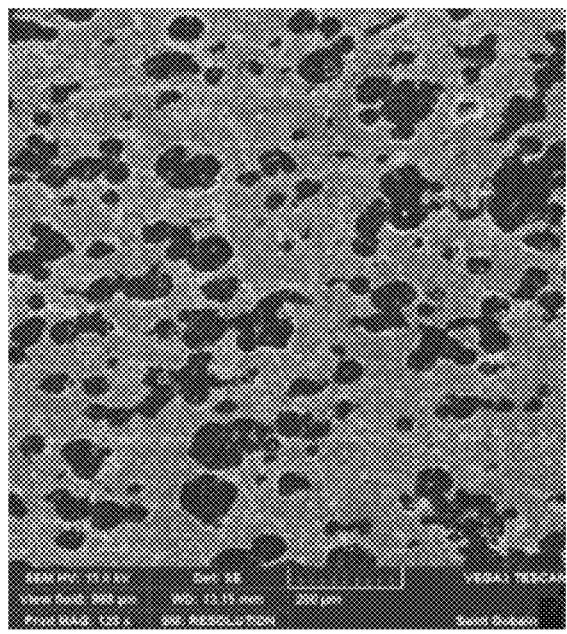
FIGS. 7A to 7C include photographs of cross-sections of ceramic composites according to embodiments herein.
Figure 7B:
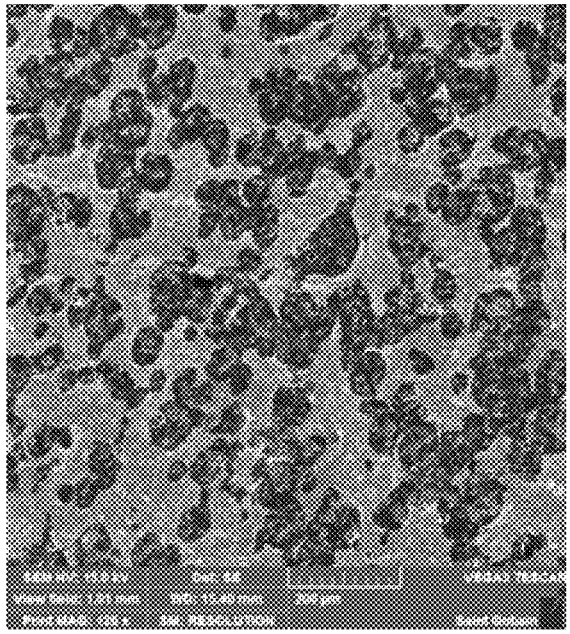
Figure 7C:
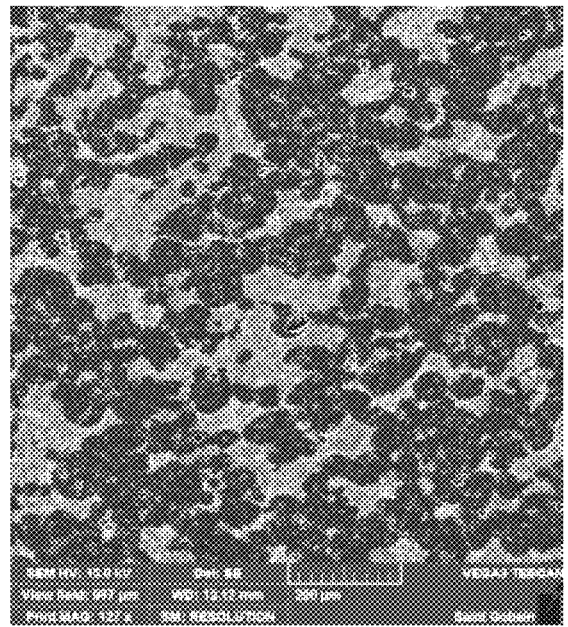

FIGS. 7A to 7C include scanning electronic microscopic images of S2, S5, and S8, respectively. Ballistic testing is to be performed on samples S1 to S9. One or more of samples S1 to S9 are expected to perform well in a variety of standardized armor ballistic tests, such as those performed in accordance with ASTM Ballistic Standards, Federal Railroad Administration FRA Ballistic Standards, MIL-SAMIT Ballistic Standards, National Institute of Justice (NIJ) Ballistic Standards, State department (SD) Ballistic Standards, or European Standard EN 1063, with or without minor modifications. One of more of S1 to S9 samples are expected to demonstrate notably improved performance in thwarting multiple shots using different types of projectiles compared to conventional samples.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges can include each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:
1. A ceramic composite, comprising:
a first ceramic phase comprising a first ceramic material including at least 50 wt % and not greater than 99.9 wt % of a silicon carbide based on a total weight of the first ceramic phase and at least 0.05 wt % of boron carbide based on the total weight of the first ceramic phase; and
a second ceramic phase comprising a second ceramic material having a different composition than the first ceramic material, wherein the second ceramic material comprises a boron carbide, wherein an average grain size of grains of the boron carbide is at least 1 micron,
wherein the ceramic composite comprises an amount of the boron carbide of at least 10 wt % for a total weight of the ceramic composite.

2. The ceramic composite of claim 1, wherein the second phase comprises at least 50 wt % and not greater than 99.9 wt % of the boron carbide of a total weight of the second phase.

3. The ceramic composite of claim 1, wherein the ceramic composite comprises an amount of the silicon carbide of at least 10 wt % for the total weight of the ceramic composite.

4. The ceramic composite of claim 1, wherein the first ceramic phase comprises grains of the silicon carbide comprising an average grain size of at least 1 micron.

5. The ceramic composite of claim 1, wherein the first ceramic phase comprises at most 12 wt % of a boron carbide based on the total weight of the first ceramic phase.

6. The ceramic composite of claim 5, wherein the boron carbide in the first ceramic phase is separated from the boron carbide in the second ceramic phase.

7. The ceramic composite of claim 1, wherein the second ceramic phase comprises at most 12 wt % of a silicon carbide based on the total weight of the second phase.

8. The ceramic composite of claim 1, wherein at least one of the first and second ceramic phases comprises elemental carbon.

9. The ceramic composite of claim 1, further comprising a weight percentage ratio of the first phase to the second phase in a range of 20:80 to 80:20.

10. A ceramic composite comprising:
a first ceramic phase comprising a first ceramic material including a silicon carbide, wherein the first ceramic phase comprises at least 86 wt % and at most 99.9 wt % of the silicon carbide based on a total weight of the first ceramic phase; and
a second ceramic phase comprising second ceramic material having a different composition than the first material, wherein the second material comprises a boron carbide and at least 0.05 wt % and at most 12 wt % of silicon carbide based on a total weight of the second ceramic phase, and wherein grains of the boron carbide comprise an average grain size of at least 1 micron,
wherein the composite comprises an amount of the boron carbide of at least 10 wt % for a total weight of the ceramic composite and an amount of the silicon carbide of at least 10 wt % for the total weight to the ceramic composite.

11. The ceramic composite of claim 10, wherein the average grain size of the grains of the boron carbide in the second ceramic phase is at most 20 microns, and wherein grains of the silicon carbide in the second ceramic phase comprises an average grain size in a range of 1 micron to 20 microns.

12. The ceramic composite of claim 10, wherein the second ceramic phase comprises at least 86 wt % and at most 99.9 wt % of the boron carbide based on the total weight of the second ceramic phase.

13. The ceramic composite of claim 10, wherein the average grain size of the grains of the boron carbide in the second ceramic phase is at least 1 microns and at most 15 microns; and wherein the average grain size of the grains of the silicon carbide is at least 1 micron and at most 80 microns.

14. The ceramic composite of claim 10, wherein the ceramic composite has an average bulk density of at least 2.4 g/cm$^3$ and at most 3.1 g/cm$^3$.

15. The ceramic composite of claim 10, wherein the ceramic composite has an average porosity of at most 5%.

16. An armor component, comprising:
a ceramic body including a ceramic composite; and
a first component adjacent the ceramic body,
wherein the ceramic composite comprises:
a first ceramic phase comprising a first ceramic material including a silicon carbide;
a second ceramic phase comprising a second ceramic material having a different composition than the first ceramic material, wherein the second ceramic material comprises a boron carbide, wherein grains of the boron carbide comprises an average grain size of at least 1 micron;
an amount of the silicon carbide of at least 10 wt % for a total weight of the ceramic composite and
an amount of the boron carbide of at least 10 wt % for a total weight of the ceramic composite,
wherein the first ceramic phase comprises at least 86 wt % and at most 99.9 wt % of the silicon carbide based on a total weight of the first ceramic phase; and
wherein the second ceramic phase comprises at least 86 wt % and at most 99.9 wt % of the boron carbide based on a total weight of the second ceramic phase.

17. The armor component of claim 16, wherein the amount of the silicon carbide is at least 30 wt % and at most 70 wt % for the total weight of the ceramic composite.

18. The armor component of claim 16, wherein the amount of the boron carbide is at least 30 wt % and at most 70 wt % for the total weight of the ceramic composite.

19. The armor component of claim 16, wherein the first ceramic phase comprises grains of the silicon carbide comprising an average grain size in a range of 1 micron to 15 microns; and wherein the second phase comprises the grains of the boron carbide comprising the average grain size in a range of 1 micron to 15 microns.

20. The armor component of claim 16, wherein the average grain size of the grains of the boron carbide in the second ceramic phase is at least 1 microns and at most 15 microns, wherein the second ceramic phase comprises a median minimum width of at least 20 microns.

* * * * *